US012269944B2

(12) United States Patent
Patel et al.

(10) Patent No.: US 12,269,944 B2
(45) Date of Patent: Apr. 8, 2025

(54) SHAPE MEMORY BEHAVIOR OF EPOXY/SLIDING-RING POLYMER COMPOSITES

(71) Applicants: Saudi Arabian Oil Company, Dhahran (SA); William Marsh Rice University, Houston, TX (US)

(72) Inventors: Hasmukh A. Patel, Katy, TX (US); Ali Zein Khater, Houston, TX (US); Peter Boul, Houston, TX (US); Pulickel M. Ajayan, Houston, TX (US); Muhammad M. Rahman, Houston, TX (US)

(73) Assignee: Saudi Arabian Oil Company, Dhahran (SA)

(*) Notice: Subject to any disclaimer, the term of this patent is extended or adjusted under 35 U.S.C. 154(b) by 363 days.

(21) Appl. No.: 17/550,653

(22) Filed: Dec. 14, 2021

(65) Prior Publication Data

US 2023/0183471 A1 Jun. 15, 2023

(51) Int. Cl.
C08L 63/00 (2006.01)
B33Y 10/00 (2015.01)
B33Y 70/00 (2020.01)
C08G 83/00 (2006.01)

(52) U.S. Cl.
CPC .............. C08L 63/00 (2013.01); B33Y 10/00 (2014.12); B33Y 70/00 (2014.12); C08G 83/007 (2013.01); C08G 2280/00 (2013.01)

(58) Field of Classification Search
CPC ......... C08L 63/00; B33Y 10/00; B33Y 70/00; C08G 83/007; C08G 2280/00

USPC ........................................................ 525/524
See application file for complete search history.

(56) References Cited

U.S. PATENT DOCUMENTS

| 1,811,799 | A | 6/1931 | Lukens |
| 2,705,050 | A | 3/1955 | Davis et al. |
| 3,301,797 | A | 1/1967 | Drucket et al. |
| 3,481,903 | A | 12/1969 | Alelio |
| 3,887,009 | A | 6/1975 | Miller et al. |
| 3,938,594 | A | 2/1976 | Rhudy et al. |
| 4,137,182 | A | 1/1979 | Golinkin |
| 4,272,430 | A | 6/1981 | Pieh et al. |

(Continued)

FOREIGN PATENT DOCUMENTS

| BR | 102018014722 | 4/2020 |
| CN | 104204035 | 12/2014 |

(Continued)

OTHER PUBLICATIONS

U.S. Appl. No. 17/550,638, Patel et al., Epoxy Compositions Containing Polyrotaxane Additives Having Improved Impact Strength, filed Dec. 14, 2021, 69 pages.

(Continued)

Primary Examiner — David T Karst
(74) Attorney, Agent, or Firm — Fish & Richardson P.C.

(57) ABSTRACT

This document relates to shape memory compositions containing a sliding-ring polymer (polyrotaxane) additive and a thermally-curable epoxy resin. The shape memory compositions are able to deform and reform in response to external stimuli. This document also relates to 3D-printed shape memory compositions containing a sliding-ring polymer (polyrotaxane) additive and a thermally-curable epoxy resin.

9 Claims, 8 Drawing Sheets

(56) References Cited

U.S. PATENT DOCUMENTS

| | | | |
|---|---|---|---|
| 4,615,809 | A | 10/1986 | King |
| 4,771,112 | A | 9/1988 | Engelbrecht |
| 4,797,433 | A | 1/1989 | Lahalih |
| 4,883,126 | A | 11/1989 | Leland |
| 5,007,481 | A | 4/1991 | Williams et al. |
| 5,062,897 | A | 11/1991 | Katsunnata |
| 5,159,828 | A | 11/1992 | Steiger |
| 5,352,290 | A | 10/1994 | Takeshita et al. |
| 5,401,312 | A | 3/1995 | Hanst |
| 5,645,637 | A | 7/1997 | Yaniv |
| 5,891,983 | A | 4/1999 | Albrecht |
| 6,089,318 | A | 7/2000 | Laramay et al. |
| 6,324,916 | B1 | 12/2001 | Jessop |
| 6,609,067 | B2 | 8/2003 | Tare |
| 6,664,215 | B1 | 12/2003 | Tomlinson |
| 6,668,927 | B1 | 12/2003 | Chatterji et al. |
| 6,828,378 | B2 | 12/2004 | Okumura et al. |
| 6,844,852 | B1 | 1/2005 | Simons |
| 7,077,199 | B2 | 7/2006 | Vinegar et al. |
| 7,497,258 | B2 | 3/2009 | Savery et al. |
| 7,523,784 | B2 | 4/2009 | Lewis et al. |
| 7,525,872 | B2 | 4/2009 | Tang et al. |
| 7,527,098 | B2 | 5/2009 | Santra et al. |
| 7,555,414 | B2 | 6/2009 | Calhoun |
| 7,612,142 | B2 | 11/2009 | Ito et al. |
| 7,622,527 | B2 | 11/2009 | Ito et al. |
| 7,637,319 | B2 | 12/2009 | Savery et al. |
| 7,654,326 | B1 | 2/2010 | Santra et al. |
| 7,773,454 | B2 | 8/2010 | Barolak et al. |
| 7,787,327 | B2 | 8/2010 | Tang et al. |
| 7,799,867 | B2 | 9/2010 | Ito et al. |
| 7,833,344 | B2 | 11/2010 | Santra et al. |
| 7,847,049 | B2 | 12/2010 | Ito et al. |
| 7,893,011 | B2 | 2/2011 | Lewis et al. |
| 7,893,168 | B2 | 2/2011 | Ito et al. |
| 7,943,718 | B2 | 5/2011 | Ito et al. |
| 7,981,943 | B2 | 7/2011 | Ito et al. |
| 8,007,911 | B2 | 8/2011 | Ito et al. |
| 8,017,688 | B2 | 9/2011 | Ito et al. |
| 8,124,569 | B2 | 2/2012 | Khan et al. |
| 8,142,562 | B2 | 3/2012 | Klettke et al. |
| 8,309,498 | B2 | 11/2012 | Funkhouser et al. |
| 8,382,476 | B2 | 2/2013 | Schulte et al. |
| 8,418,763 | B1 | 4/2013 | Deen et al. |
| 8,450,252 | B2 | 5/2013 | Funkhouser et al. |
| 8,450,415 | B2 | 5/2013 | Ito et al. |
| 8,580,906 | B2 | 11/2013 | Hayashi et al. |
| 8,587,493 | B2 | 11/2013 | Dickey et al. |
| 8,673,364 | B2 | 3/2014 | Jalota et al. |
| 8,770,038 | B2 | 7/2014 | Secq |
| 8,899,331 | B2 | 12/2014 | Burnham |
| 9,023,150 | B2 | 5/2015 | Brenneis et al. |
| 9,068,051 | B2 | 6/2015 | Yamasaki et al. |
| 9,085,487 | B2 | 7/2015 | Da Silva et al. |
| 9,228,993 | B2 | 1/2016 | Shine et al. |
| 9,266,972 | B2 | 2/2016 | Yamasaki et al. |
| 9,375,699 | B2 | 6/2016 | Ladet |
| 9,428,682 | B2 | 8/2016 | Muthusamy et al. |
| 9,617,460 | B2 | 4/2017 | Reddy |
| 9,708,869 | B2 | 7/2017 | Sarmah et al. |
| 10,009,994 | B2 | 6/2018 | Sawada et al. |
| 10,048,336 | B2 | 8/2018 | Hakimuddin |
| 10,060,242 | B2 | 8/2018 | Benoit et al. |
| 10,150,905 | B1 | 12/2018 | Reddy |
| 10,351,758 | B2 | 7/2019 | Hull et al. |
| 10,647,909 | B2 | 5/2020 | Li et al. |
| 10,836,950 | B1 | 11/2020 | Patel et al. |
| 10,871,061 | B2 | 12/2020 | Hull et al. |
| 10,913,683 | B2 | 2/2021 | Rahman et al. |
| 10,966,317 | B2 | 3/2021 | Abe et al. |
| 11,078,406 | B2 | 8/2021 | Hull et al. |
| 11,130,900 | B2 | 9/2021 | Patel et al. |
| 11,230,497 | B2 | 1/2022 | Patel et al. |
| 11,279,864 | B2 | 3/2022 | Patel et al. |
| 11,479,708 | B2 | 10/2022 | Patel et al. |
| 2003/0138398 | A1 | 7/2003 | Okumura et al. |
| 2006/0048671 | A1 | 3/2006 | Ong |
| 2008/0006410 | A1 | 1/2008 | Looney et al. |
| 2008/0156225 | A1 | 7/2008 | Bury |
| 2008/0287633 | A1 | 11/2008 | Drumheller |
| 2009/0030108 | A1 | 1/2009 | Ito et al. |
| 2009/0214871 | A1 | 8/2009 | Fukuda et al. |
| 2009/0312491 | A1 | 12/2009 | Ito et al. |
| 2009/0312492 | A1 | 12/2009 | Ruslim et al. |
| 2010/0006288 | A1 | 1/2010 | Santra et al. |
| 2012/0006551 | A1 | 1/2012 | Carman et al. |
| 2012/0322695 | A1 | 12/2012 | Kefi et al. |
| 2013/0118740 | A1 | 5/2013 | Sherman et al. |
| 2014/0096964 | A1 | 4/2014 | Chakraborty et al. |
| 2014/0342531 | A1 | 11/2014 | Tominaga et al. |
| 2015/0024122 | A1 | 1/2015 | Wu et al. |
| 2015/0033719 | A1 | 2/2015 | Lawrence et al. |
| 2015/0057196 | A1 | 2/2015 | Debord et al. |
| 2015/0061669 | A1 | 3/2015 | Hakimuddin |
| 2015/0152724 | A1 | 6/2015 | Amendt et al. |
| 2015/0198008 | A1 | 7/2015 | Smith et al. |
| 2016/0102238 | A1 | 4/2016 | Muthusamy et al. |
| 2016/0177655 | A1 | 6/2016 | Fripp |
| 2016/0264813 | A1 | 9/2016 | Sawada et al. |
| 2017/0066959 | A1 | 3/2017 | Hull et al. |
| 2017/0218248 | A1 | 8/2017 | Boul et al. |
| 2017/0369761 | A1 | 12/2017 | Jones et al. |
| 2018/0045870 | A1 | 2/2018 | Asahi et al. |
| 2018/0215988 | A1 | 8/2018 | Gamwell et al. |
| 2018/0335494 | A1 | 11/2018 | Hakimuddin |
| 2019/0054536 | A1 | 2/2019 | Xu et al. |
| 2019/0077071 | A1 | 3/2019 | Ware et al. |
| 2019/0144569 | A1 | 5/2019 | Ke et al. |
| 2019/0211658 | A1 | 7/2019 | Hull et al. |
| 2019/0310396 | A1 | 10/2019 | Matsumoto et al. |
| 2020/0131396 | A1 | 4/2020 | Kang et al. |
| 2020/0277441 | A1 | 9/2020 | Stoddart et al. |
| 2020/0308341 | A1 | 10/2020 | Yan et al. |
| 2020/0325070 | A1 | 10/2020 | Patel et al. |
| 2021/0024806 | A1 | 1/2021 | Patel et al. |
| 2021/0024808 | A1 | 1/2021 | Schipper et al. |
| 2021/0024814 | A1 | 1/2021 | Schipper et al. |
| 2021/0087419 | A1 | 3/2021 | Zhu et al. |
| 2021/0101833 | A1 | 4/2021 | Thaemlitz et al. |
| 2021/0102112 | A1 | 4/2021 | Patel |
| 2021/0130676 | A1 | 5/2021 | Patel et al. |
| 2021/0198558 | A1 | 7/2021 | Hull et al. |
| 2021/0198559 | A1 | 7/2021 | Hull et al. |
| 2021/0222055 | A1 | 7/2021 | Schipper et al. |
| 2021/0302292 | A1 | 9/2021 | Boul et al. |
| 2022/0169909 | A1 | 6/2022 | Patel et al. |
| 2022/0235182 | A1* | 7/2022 | Inoue .................. C08G 18/423 |
| 2022/0289887 | A1 | 9/2022 | Santra et al. |
| 2023/0183534 | A1 | 6/2023 | Patel et al. |

FOREIGN PATENT DOCUMENTS

| | | |
|---|---|---|
| CN | 107522436 | 12/2017 |
| CN | 109133754 | 1/2019 |
| CN | 112456870 | 3/2021 |
| EP | 0383348 | 8/1990 |
| EP | 2820413 | 1/2015 |
| EP | 3060909 | 8/2016 |
| JP | H 10158045 | 6/1998 |
| JP | 2016088878 | 5/2016 |
| JP | 6647751 | 2/2020 |
| WO | WO 2016053319 | 4/2016 |
| WO | WO 2016080674 | 5/2016 |
| WO | WO 2019090140 | 5/2019 |
| WO | WO 2019147559 | 8/2019 |
| WO | WO-2020256046 A1 * | 12/2020 ......... C08B 37/0012 |

OTHER PUBLICATIONS

U.S. Appl. No. 16/393,016, filed Apr. 24, 2019, Hakimuddin et al.
U.S. Appl. No. 16/593,820, Patel et al., filed Oct. 4, 2019.
U.S. Appl. No. 16/668,730, Patel et al., filed Oct. 30, 2019.
U.S. Appl. No. 17/107,428, Hull et al., filed Nov. 30, 2020.

(56) References Cited

OTHER PUBLICATIONS

U.S. Appl. No. 17/550,631, Patel et al., filed Dec. 14, 2021.
Acquah et al., "Carbon Nanotubes and Graphene as Additives in 3D Printing," Carbon Nanotubes—Current Progress of Their Polymer Composites, InTech, 2016, 26 pages.
Adhikary et al., "Effects of carbon nanotubes on expanded glass and silica aerogel based lightweight concrete," Nature, Scientific Reports, Jan. 2021, 11:2104, 11 pages.
Andrew, "Global $CO_2$ emissions from cement production," Earth Syst. Sci. Data, Jan. 2018, 10:195-217, 23 pages.
API, "10B-2, Recommended Practice for Testing Well Cements," American Petroleum Institute, Apr. 2019, 1-124, RP 10B-2, 124 pages.
Arbad et al., "A Review of Recent Research on Contamination of Oil Well Cement with Oil-Based Drilling Fluid and the Need of New and Accurate Correlations," ChemEngineering, Apr. 2020, 20 pages.
Ashik et al., "A review on methane transformation to hydrogen and nanocarbon: Relevance of catalyst characteristics and experimental parameters on yield," Renewable and Sustainable Energy Reviews, Sep. 2017, 76:743-767, 25 pages.
Asmi.jp [online], "SeRM Series Products List," asmi.jp, Advanced Softmaterials Inc., retrieved from URL <www.asmi.jp/en/product#sec_03>, retrieved on Aug. 15, 2019, available on or before Jan. 2013 (via wayback machine URL <https://web.archive.org/web/20130315000000*/www.asmi.jp/en/product>), 5 pages.
Bagheri et al., "Rubber-Toughened Epoxies: A Critical Review," Polym. Rev., 2009, 49:201-225, 26 pages.
Bett, "Geothermal Well Cementing, Materials and Placement Techniques," United Nations University, Geothermal Training Programme, Reports 2010, No. 10, 2010, 32 pages.
Brichni et al., "Optimisation of Magnesium Oxychloride Cement Properties by Silica Glass," Adv. Cem. Res., Jul. 2016, 28:10 (654-663), 10 pages.
Bruns and Stoddart, "The Nature of the Mechanical Bond: from molecules to machines," Wiley, 2017, 786 pages.
Buchanan et al., "Metal 3D printing in construction: A review of methods, research, applications, opportunities and challenges," Engineering Structures, Feb. 2019, 180:332-348, 36 pages.
Cao et al., "Study of the in-situ growth of carbon nanofibers on cement clinker," Mater. Res. Express, May 2020, 7:5 (055306), 10 pages.
Capper et al., "Internal antiplasticisation in highly crosslinked amine cured multifunctional epoxy resins," Polymer, 2018, 146:321-330, 11 pages.
Carey et al., "Fracture-permeability behavior of shale," Journal of Unconventional Oil and Gas Resources, Sep. 2015, 11, 53 pages.
Chambers et al., "Liquid crystal elastomer-nanoparticle systems for actuation," Journal of Materials Chemistry, 2009, 19.11:1524-1531, 7 pages.
Chatham et al., "A review of the process physics and material screening methods for polymer powder bed fusion additive manufacturing," Progress in Polymer Science, Jun. 2019, 93:68-95, 28 pages.
Chen et al., "Enhancement of mechanical and wear resistance performance in hBN reinforced epoxy nanocomposites," Polym. Int., 2017, 66: 659, 25 pages.
Chen et al., "Rapid control of phase growth by nanoparticles," Nature Communications, May 2014, 5.1, 9 pages.
Cho et al., "Cell-Encapsulating Hydrogel Puzzle: Polyrotaxane-Based Self-Healing Hydrogels," Chem. Eur. J., 2019, 26(4):913-920, 22 pages.
Choi et al., "Highly elastic binders integrating polyrotaxanes for silicon microparticle anodes in lithium ion batteries," Science, Jul. 2017, 357.6348:279-283, 5 pages.
Cordero et al., "Strengthening of ferrous binder jet 3D printed components through bronze infiltration," Additive Manufacturing, May 2017, 15:87-92, 6 pages.
Cui et al., "Electrical and mechanical properties of electrically conductive adhesives from epoxy, micro-silver flakes, and nano-hexagonal boron nitride particles after humid and thermal aging," International Journal of Adhesion and Adhesives, Jul. 2013, 44:232-236, 5 pages.
Davidson et al., "3D Printable and Reconfigurable Liquid Crystal Elastomers with Light-Induced Shape Memory via Dynamic Bond Exchange," Advanced Materials, Jan. 2020, 6 pages.
DebRoy et al., "Additive manufacturing of metallic components-process, structure and properties," Progress in Materials Science, Mar. 2018, 92:112-224, 114 pages.
DebRoy et al., "Scientific, technological and economic issues in metal printing and their solutions," Nature Materials, Jul. 2019, 18, 7 pages.
Dowling et al., "A review of critical repeatability and reproducibility issues in powder bed fusion," Materials & Design, Jan. 2020, 186, 18 pages.
El-Wardany et al., "Challenges in three-dimensional printing of high-conductivity copper," Journal of Electronic Packaging, Jun. 2018, 140.2:020907, 12 pages.
Enayatpour et al., "Advanced Modeling of Cement Displacement Complexities," SPE/IADC-184702-MS, Society of Petroleum Engineers (SPE), presented at the SPE/IADC Drill Conference and Exhibition, Mar. 2017, 21 pages.
Fayazfar et al., "A critical review of powder-based additive manufacturing of ferrous alloys: Process parameters, microstructure and mechanical properties," Materials & Design, Apr. 2018, 144:98-128, 31 pages.
Foldyna et al., "Dispersion of carbon nanotubes for application in cement composites," Science Direct, Procedia Engineering, 2016, 149:94-99, 6 pages.
Funkhouser and Norman, "Synthetic Polymer Fracturing Fluid for High-Temperature Application," SPE 80236, Society of Petroleum Engineers (SPE), International Symposium on Oilfield Chemistry, Feb. 5-7, 2003, 6 pages.
Gaillard et al., "Novel Associative Acrylamide-based Polymers for Proppant Transport in Hydraulic Fracturing Fluids," SPE 164072, Society of Petroleum Engineers (SPE), SPE International Symposium on Oilfield Chemistry, Apr. 8-10, 2013, 11 pages.
Gelebart et al., "Photoresponsive fiber array: toward mimicking the collective motion of cilia for transport applications," Advanced Functional Materials, Aug. 2016, 26.29:5322-5327, 6 pages.
Genedy et al., "Examining epoxy-based nanocomposites in wellbore seal repair for effective $CO_2$ sequestration," Energy Procedia, Jan. 2014, 63:5798-5807, 10 pages.
Gladman et al., "Biomimetic 4D printing," Nature Materials, Apr. 2016, 15.4:413-418, 7 pages.
Global Status of CCS Report, Dec. 11, 2020, Global CCS Institute, 44 pages.
Goeppert et al., "Air as the renewable carbon source of the future: an overview of $CO_2$ capture from the atmosphere," Energy Environ. Sci., 2012, 5: 7833, 12 pages.
Gojny et al., "Carbon nanotube-reinforced epoxy-composites: enhanced stiffness and fracture toughness at low nanotube content," Compos. Sci. Technol., 2004, 64:2363-2371, 9 pages.
Gong et al., "Analysis of defect generation in Ti-6Al-4V parts made using powder bed fusion additive manufacturing processes," Additive Manufacturing, Oct. 2014, 1, 60 pages.
Gorsse et al., "Additive manufacturing of metals: a brief review of the characteristic microstructures and properties of steels, Ti-6Al-4V and high-entropy alloys," Science and Technology of Advanced Materials, Dec. 2017, 18.1:584-610, 28 pages.
Guo et al., "Shape memory epoxy composites with high mechanical performance manufactured by multi-material direct ink writing," Compos. Part A Appl. Sci. Manuf., 2020, 135: 105903, 8 pages.
Gupta and Carman, "Fracturing Fluid for Extreme Temperature Conditions is Just as Easy as the Rest," SPE 140176, Society of Petroleum Engineers (SPE), SPE Hydraulic Fracturing Technology Conference, Jan. 24-26, 2011, 5 pages.
Harada et al., "Preparation and properties of inclusion complexes of polyethylene glycol with α-cyclodextrin," Macromolecules, 1993, 26:5698-5703, 6 pages.
Harada et al., "Supramolecular polymeric materials via cyclodextrin—guest interactions," Accounts of Chemical Research, Jul. 2014, 47.7:2128-2140, 13 pages.

(56) References Cited

OTHER PUBLICATIONS

Hart et al., "Material properties and applications of mechanically interlocked polymers," Nat. Rev. Mater., 2021, 6:6 (508-530), 23 pages.
Hepburn et al., "The technological and economic prospects for CO2 utilization and removal," Nature, Nov. 2019, 575, 11 pages.
Herzog et al., "Additive Manufacturing of Metals," Acta Mater. 2016, 117:371-392, 22 pages.
Hitzler et al., "In-plane anisotropy of selective laser-melted stainless steel: The importance of the rotation angle increment and the limitation window," Proceedings of the Institution of Mechanical Engineers, Part L: Journal of Materials: Design and Applications, Jul. 2019, 233.7:1419-1428, 10 pages.
Hojjatzadeh et al., "Direct observation of pore formation mechanisms during LPBF additive manufacturing process and high energy density laser welding," International Journal of Machine Tools and Manufacture 153:103555, Jun. 2020, 32 pages.
Houben et al., "Plasticization behavior of crown-ether containing polyimide membranes for the separation of $CO_2$," Separation and Purification Technology, 2021, 255:117307, 10 pages.
Hoyos-Palacio et al., "Catalytic effect of Fe, Ni, Co and Mo on the CNTs production," IOP Conference Series: Materials Science and Engineering, 2014, 59:012005, 9 pages.
Huang et al., "Finite element analysis of thermal behavior of metal powder during selective laser melting," International Journal of Thermal Sciences, Jun. 2016, 104:146-157, 12 pages.
Hull et al., "Chemomechanical Effects of Oxidizer-$CO_2$ Systems Upon Hydraulically Fractured Unconventional Source Rock," Canadian Journal of Chemical Engineering, 2021, 26 pages.
Hull et al., "Oxidative Kerogen Degradation: A Potential Approach to Hydraulic Fracturing in Unconventionals," Energy Fuels, 2019, 33: 4758-4766, 8 pages.
Hull et al., "Synthesis and structural characterization of $CO_2$-soluble oxidizers [$Bu_4N$]$BrO_3$ and [$Bu_4N$]$ClO_3$ and their dissolution in cosolvent-modified $CO_2$ for reservoir applications," RSC Advances, Royal Society of Chemistry, Dec. 21, 2020, 10: 44973, 8 pages.
Hur et al., "Reactive force fields for modeling oxidative degradation of organic matter in geological formations," RSC Adv. 2021, 11:29298-29307, 23 pages.
Isaka et al., "Influence of long-term operation of supercritical carbon dioxide based enhanced geothermal system on mineralogical and microstructurally-induced mechanical alteration of surrounding rock mass," Renewable Energy, Jun. 2019, 136, 14 pages.
Isfahani et al., "Dispersion of multi-walled carbon nanotubes and its effects on the properties of cement composites," Cement and Concrete Composites, Nov. 2016, 74:154-163, 10 pages.
Isobe et al., "Thermally dissociable pseudo-polyrotaxane as a supramolecular shrinkage suppressor for epoxy-amine curing system," Journal of Polymer Science Part A: Polymer Chemistry, Mar. 2008, 46.6:2305-2308, 4 pages.
Jafariesfad et al., "Cement Sheath Modification Using Nanomaterials for Long-term Zonal Isolation of Oil Wells: Review," Journal of Petroleum Science and Engineering, 2017, 156:662-672, 28 pages.
Jiang et al., "Highly Stretchable and Instantly Recoverable Slide-Ring Gels Consisting of Enzymatically Synthesized Polyrotaxane with Low Host Coverage," Chem. Mater., 2018, 30:15 (5013), 10 pages.
Jin et al., "Synthesis and application of epoxy resins: A review," J. Ind. Eng. Chem., Sep. 2015, 29:1-11, 11 pages.
Kato et al., "Organic—Inorganic Hybrid Slide-Ring Gels: Polyrotaxanes Consisting of Poly(dimethylsiloxane) and γ-Cyclodextrin and Subsequent Topological Cross-Linking," Macromolecules, Aug. 18, 2009, 42:7129-7136, 8 pages.
Khuenkaew et al., "Resistance spot welding of SUS316L austenitic/SUS425 ferritic stainless steels: weldment characteristics, mechanical properties, phase transformation and solidification," Metals, Jun. 2019, 9.6, 17 pages.
Kim et al., "Development of $CO_2$-Selective Polyimide-Based Gas Separation Membranes Using Crown Ether and Polydimethylsiloxane," Polymers, 2021, 13:1927, 15 pages.
Koyanagi et al., "Movable Cross-Linked Polymeric Materials from Bulk Polymerization of Reactive Polyrotaxane Cross-Linker with Acrylate Monomers," Macromolecules 2017, 50:5695-5700, 6 pages.
Kuo et al., "Bonding behavior of repair material using fly-ash/ground granulated blast furnace slag-based geopolymer," Materials, Jan. 2019, 12.10, 16 pages.
Ladva et al., "The Cement-to-Formation Interface in Zonal Isolation," IADC/SPE 88016, Society of Petroleum Engineers (SPE), presented at the IADC/SPE Asia Pacific Drilling Technology Conference and Exhibition in Kuala Lumpur, Malaysia, Sep. 13-15, 2004, 369-382, 14 pages.
Levenfeld et al., "Effect of residual carbon on the sintering process of M2 high speed steel parts obtained by a modified metal injection molding process," Metallurgical and Materials Transactions, Jun. 2002, A:33.6 (1843-1851), 9 pages.
Lewis et al., "Direct ink writing of three-dimensional ceramic structures," Journal of the American Ceramic Society, Dec. 2006, 89.12:3599-3609, 11 pages.
Li et al., "Contamination of Cement Slurries with Diesel-Based Drilling Fluids in a Shale Gas Well," J. Nat. Gas Sci. Eng., Aug. 2015, 27:1312-1320, 9 pages.
Li et al., "Residual stress in metal additive manufacturing," Procedia Cirp, Jan. 2018, 71:348-353, 6 pages.
Li et al., "Slide-ring shape memory polymers with movable crosslinks," React. Funct. Polym., 2017, 119:26-36, 25 pages.
Lin et al., "Rapid macroscale shape morphing of 3D-printed polyrotaxane monoliths amplified from pH-controlled nanoscale ring motions," J. Mater. Chem., 2018, C:6 (11956), 5 pages.
Lin et al., "Ring Shuttling Controls Macroscopic Motion in a Three-Dimensional Printed Polyrotaxane Monolith," Chem. Int. Ed., 2017, 56:4452-4457, 7 pages.
Liu et al., "A novel method to evaluate cement shale bond strength," SPE-173802-MS, Society of Petroleum Engineers (SPE), presented at the SPE International Symposium on Oilfield Chemistry, The Woodlands, Texas, Apr. 13-15, 2015, 20 pages.
Liu et al., "Graphene Lubricant," Applied Materials Today, 2020, 20:2020 (100662), 31 pages.
Luo et al., "A survey of finite element analysis of temperature and thermal stress fields in powder bed fusion additive manufacturing," Additive Manufacturing, May 2018, 21:318-332, 15 pages.
Mather et al., "Michael addition reactions in macromolecular design for emerging technologies," Progress in Polymer Science, May 2006, 31.5:487-531, 45 pages.
Mayumi et al., "Structure and dynamics of polyrotaxane and slide-ring materials," Polymer, 2010, 51:959-967, 9 pages.
Mikhalchan et al., "Aligned carbon nanotube—epoxy composites: the effect of nanotube organization on strength, stiffness, and toughness," J. Mater. Sci., 2016, 51:10005-10025, 21 pages.
Mostafaei et al., "Binder jet 3D printing—Process parameters, materials, properties, modeling, and challenges," Progress in Materials Science, Jun. 2021, 119:100707, 141 pages.
Nakahata et al., "Self-Healing Materials Formed by Cross-Linked Polyrotaxanes with Reversible Bonds," Chem, 2016, 1:5 (766-775), 11 pages.
Nelson and Guillot, "Well Cementing," Second Edition, Schlumberger, 2006, 807 pages.
Obayi et al., "Effect of grain sizes on mechanical properties and biodegradation behavior of pure iron for cardiovascular stent application," Biomatter, Jan. 2016, 6.1:e959874, 10 pages.
Ohm et al., "Liquid Crystalline Elastomers as Actuators and Sensors," Advanced Materials, Aug. 2010, 22: 3366-3387, 22 pages.
Oliveira et al., "Processing parameters in laser powder bed fusion metal additive manufacturing," Materials & Design, Aug. 2020, 193, 12 pages.
Opedal et al., "Experimental study on the cement-formation bonding," SPE 168138, Society of Petroleum Engineers (SPE), presented at the SPE International Symposium and Exhibition on Formation Damage Control, Lafayette, Louisiana, Feb. 26-28, 2014, 12 pages.
Peerzada et al., "Additive Manufacturing of Epoxy Resins: Materials, Methods, and Latest Trends," Ind. Eng. Chem. Res., 2020, 59:14, 52 pages.
Prabhakar et al., "Enhancing the Gel Transition Time and Right-Angle-Set Property of Oil Well Cement Slurries by Incorporating

(56) References Cited

OTHER PUBLICATIONS

CSA Cement and Gypsum," IPTC-19224-MS, International Petroleum Technology Conference, Mar. 2019, 12 pages.
Prajapati et al., "Measurement of anisotropic thermal conductivity and inter-layer thermal contact resistance in polymer fused deposition modeling (FDM)," Additive Manufacturing, May 2018, 21:84-90, 7 pages.
Pruksawan et al., "Homogeneously Dispersed Polyrotaxane in Epoxy Adhesive and Its Improvement in the Fracture Toughness," Macromolecules, 2019, 52:2464-2475, 12 pages.
Radonjic and Oyibo, "Experimental evaluation of wellbore cement-formation shear bond strength in presence of drilling fluid contamination," International Conference on Porous Media and Their Applications in Science, Engineering and Industry, Hawaii, Jun. 24, 2014, 7 pages.
Ramsdale-Capper et al., "Internal antiplasticisation in highly cross-linked amine cured multifunctional epoxy resins," Polymer, Jun. 2018, 146:321-330, 10 pages.
Reddy et al., "Relating Cement Additive Performance to Mix Water Composition for Deep Water and Salt Zone Applications," SPE-180344-MS, Society of Petroleum Engineers (SPE), SPE Deepwater Drilling and Completions Conference 2016, Sep. 2016, 20 pages.
Rimdusit et al., "Shape memory polymers from benzoxazine-modified epoxy," Smart Mater. Struct., 2013, 22:075033, 13 pages.
Roca et al., "Policy needed for additive manufacturing," Nature Materials, Aug. 2016, 15:8, 4 pages.
Saed et al., "Molecularly-engineered, 4D-Printed liquid crystal elastomer actuators," Advanced Functional Materials, 2019, 29.3, 9 pages.
Sajadi et al., "Direct ink writing of cement structures modified with nanoscale additive," Advanced Engineering Materials, Aug. 2019, 21.8:1801380, 10 pages.
Seo et al., "Development of a supramolecular accelerator simultaneously to increase the cross-linking density and ductility of an epoxy resin," Chem. Eng. J., 2019, 356:303-311, 30 pages.
Seo et al., "Enhanced Mechanical Strength, Flexibility, and Shape-Restoring Rate of a Drug-Eluting Shape-Memory Polymer by Incorporation of Supramolecular Cross-Linkers," ACS Macro Lett., 2020, 9:389-395, 7 pages.
Simao et al., "Cementing Solutions for Salt-and $CO_2$-Laden Presalt Zones," SPE-180336-MS, Society of Petroleum Engineers (SPE), SPE Deepwater Drilling and Completions Conference Proceedings, Sep. 2016, 11 pages.
Singh et al., "Powder bed fusion process in additive manufacturing: An overview," Materials Today: Proceedings, Jan. 2020, 26:3058-3070, 13 pages.
Snow et al., "Invited Review Article: Review of the formation and impact of flaws in powder bed fusion additive manufacturing," Additive Manufacturing, Jul. 2020, 15 pages.
Soto et al., "Self-assembly of a supramolecular network with pseudo-rotaxane cross-linking nodes and its transformation into a mechanically locked structure by rotaxane formation," Chemical Communications, 2016, 52:14149, 5 pages.
Sun et al., "Short-aramid-fiber toughening of epoxy adhesive joint between carbon fiber composites and metal substrates with different surface morphology," Compos. Part B Eng., 2015, 77:38-45, 30 pages.
Tagliaferri et al., "Direct ink writing of energy materials," Materials Advances, 2021, 2.2:540-563, 24 pages.
Tao et al., "A Brief Review of Gas Migration in Oilwell Cement Slurries," Energies, 2021, 14:2369, 22 pages.
Telschow et al., "Cement Formation—A Success Story in a Black Box: High Temperature Phase Formation of Portland Cement Clinker," Industrial & Engineering Chemistry Research (I&EC Research), American Chemical Society (ACS Publications), Jul. 2012, 51:34 (10983-11004), 22 pages.
Tong et al., "Committed Emissions from Existing Energy Infrastructure Jeopardize 1.5° C Climate Target," Nature, 2019, 572:7769 (373-377), 17 pages.
Tran et al., "3D printing of highly pure copper," Metals, Jul. 2019, 9.7:756, 24 pages.
Ürk et al., "Structure-controlled growth of vertically-aligned carbon nanotube forests using iron-nickel bimetallic catalysts," Materials Advances, 2021, 2:2021-2030, 10 pages.
Utela et al., "A review of process development steps for new material systems in three dimensional printing (3DP)," Journal of Manufacturing Processes, Jul. 2008, 10.2:96-104, 9 pages.
Vyavahare et al., "Fused deposition modelling: A review," Rapid Prototyping Journal, Jan. 2020, 26 pages.
Wang et al., "Molecular Simulation of $CO_2/CH_4$ Competitive Adsorption on Shale Kerogen for $CO_2$ Sequestration and Enhanced Gas Recovery," J. Phys. Chem. C, 2018, 122:30 (17009-17018), 29 pages.
Wang et al., "Relaxation and Reinforcing Effects of Polyrotaxane in an Epoxy Resin Matrix," Macromolecules, 2006, 39:3 (1046-1052), 7 pages.
Welch et al., "Shear strength and permeability of the cement-casing interface," International Journal of Greenhouse Gas Control, Apr. 2020, 95, 29 pages.
Wenz et al., "Cyclodextrin Rotaxanes and Polyrotaxanes," Chem. Rev., 2006, 106:782-817, 36 pages.
Wimpenny et al., "Advances in 3D printing & additive manufacturing technologies," Singapore: Springer, 2017, 195 pages.
Wu et al., "A Crown Ether-Containing Copolyimide Membrane with Improved Free Volume for $CO_2$ Separation," Industrial & Engineering Chemical Research, 2019, 58:14357-14367, 44 pages.
Wu et al., "High-strain slide-ring shape-memory polycaprolactone-based polyurethane," Soft Matter, 2018, 14:4558, 28 pages.
Yakovlev et al., "Modification of Cement Matrix Using Carbon Nanotube Dispersions and Nanosilica," Science Direct, Procedia Engineering, Modern Building Materials, Structures and Techniques, MBMST 2016, 2017, 172:1261-1269, 9 pages.
Zhan et al., "In situ-grown carbon nanotubes enhanced cement-based materials with multifunctionality," Cement and Concrete Composites, Apr. 2020, 108:103518, 11 pages.
Zhang et al., "Dibenzo-21-crown-7-ether contained 6FDA-based polyimide membrane with improved gas selectivity," Separation and Purification Technology, 2021, 264:118454, 13 pages.
Zhang et al., "Three-Dimensional Printing of Continuous Flax Fiber-Reinforced Thermoplastic Composites by Five-Axis Machine," Materials, 2020, 13:1678, 11 pages.
Zoback, "Reservoir geomechanics," Cambridge University Press, 2010, 2 pages.

\* cited by examiner

SHAPE MEMORY BEHAVIOR OF EPOXY/SLIDING-RING POLYMER COMPOSITES

TECHNICAL FIELD

This disclosure relates generally to shape memory materials and, more particularly, materials that can undergo reversible shape changes. The shape memory materials of the present disclosure are epoxy composites that contain sliding-ring polymer compositions. This disclosure also relates to methods of using the shape memory materials to improve the mechanical and thermal properties of compositions into which they are incorporated.

BACKGROUND

During the primary well cementing process, cement is placed in the annulus between the rock formations of the wellbore and the steel casing in order to provide an impermeable seal and achieve zonal isolation. Complete and durable zonal isolation, or preventing the flow of fluids between zones in the well, is the foremost goal of cementing. The quality of the cement work has a direct impact on the economic longevity of the well throughout the life of producing oil and gas and the efficacy of the primary cementing operation is governed by the well production and performance over the life of the well. A challenge faced in cementing oil and gas wells is the failure of the cement sheaths. Several strategies have been implemented to avoid failure in the cement, such as variations in the procedure for placing the cement, incorporation of additives to improve the curing behavior, changes in the composition of the cement, and blending elastic materials. However, these strategies are often unable to overcome the failure in the oil well cement sheath.

Thus, there is a need for compositions, such as sealant compositions, cement compositions, or polymeric compositions, with improved mechanical and thermal properties, such as compositions with opposite temperature responses in the ranges of temperatures typically seen when a structure is in service.

SUMMARY

Provided in the present disclosure is a shape memory composition. In some embodiments, the shape memory composition contains a thermally-curable epoxy resin and a sliding-ring polymer additive comprising at least two molecules of a polyrotaxane, where the polyrotaxane includes a linear polymer; at least one ring compound, where the linear polymer is threaded through the opening of the ring compound; and stopper groups disposed at both end terminals of the linear polymer.

In some embodiments of the shape memory composition, the epoxy resin is present in an amount of about 50 wt % to about 95 wt %, about 55 wt % to about 95 wt %, about 60 wt % to about 90 wt %, about 65 wt % to about 90 wt %, about 75 wt % to about 85 wt %, or about 80 wt % to about 85 wt % of the shape memory composition.

In some embodiments of the shape memory composition, the sliding-ring polymer additive is cross-linked polyrotaxane beads. In some embodiments, the cross-linked polyrotaxane beads are surface-functionalized with epoxide rings.

In some embodiments of the shape memory composition, the sliding-ring polymer additive is present in an amount of about 1 wt % to about 30 wt %, about 1 wt % to about 25 wt %, about 1 wt % to about 15 wt %, about 2 wt % to about 10 wt %, about 2.5 wt % to about 5 wt %, about 5 wt % to about 20 wt %, or about 10 wt % to about 15 wt % of the shape memory composition. In some embodiments, the sliding-ring polymer additive is present in an amount of about 10 wt % of the shape memory composition.

In some embodiments, the shape memory composition is 3D-printed.

In some embodiments, the shape memory composition is able to shape deform into a reconfigurable memory shape or temporary shape by applying an external force or stimulus. In some embodiments, the external force or stimulus is selected from temperature, pressure, chemical environment, and light. In some embodiments, the external force or stimulus is temperature.

In some embodiments, the shape memory composition is deformable at a temperature of about 80° C. to about 120° C. and shape memorable at room temperature. In some embodiments, the shape memory composition is deformable at a temperature of about 100° C. and shape memorable at room temperature.

In some embodiments, the shape memorable form is transformed back to its original shape at a temperature of about 25° C. to about 140° C. In some embodiments, the shape memorable form is transformed back to its original shape at a temperature of about 100° C.

Also provided in the present disclosure is a 3D-printed shape memory composition. In some embodiments, the composition contains a thermally-curable epoxy resin and a sliding-ring polymer additive, where the 3D-printed shape memory composition is deformable into a reconfigurable memory shape or temporary shape by applying an external force or stimulus.

In some embodiments of the 3D-printed shape memory composition, the external force or stimulus is selected from temperature, pressure, chemical environment, and light. In some embodiments, the external force or stimulus is temperature.

In some embodiments, the 3D-printed shape memory composition is deformable at a temperature of about 80° C. to about 120° C. and shape memorable at room temperature. In some embodiments, the shape memory composition is deformable at a temperature of about 100° C. and shape memorable at room temperature.

In some embodiments, the 3D-printed shape memorable form is transformed back to its original shape at a temperature of about 25° C. to about 140° C. In some embodiments, the shape memorable form is transformed back to its original shape at a temperature of about 100° C.

Also provided in the present disclosure is a method for preparing a 3D-printed shape memory composition. In some embodiments, the method includes mixing a thermally-curable epoxy resin and a sliding-ring polymer additive comprising at least two molecules of a polyrotaxane, where the polyrotaxane includes a linear polymer; at least one ring compound, where the linear polymer is threaded through the opening of the ring compound; and stopper groups disposed at both end terminals of the linear polymer; and 3D-printing the shape memory composition.

DESCRIPTION OF DRAWINGS

FIG. 3A), β-cyclodextrin (β-CD; FIG. 3B), and γ-cyclodextrin (γ-CD; FIG. 3C).

FIG. 7A illustrates how the original shape is recovered when heated in a relaxed state. FIG. 7B depicts a prediction of recovery path through a computer model. FIG. 7C shows recovery to the original shape captured through the still frame images from a video.

FIG. 8A depicts storage modulus and FIG. 8B depicts loss factor of neat epoxy and epoxy/PRB structures.

DETAILED DESCRIPTION

Figure 1:
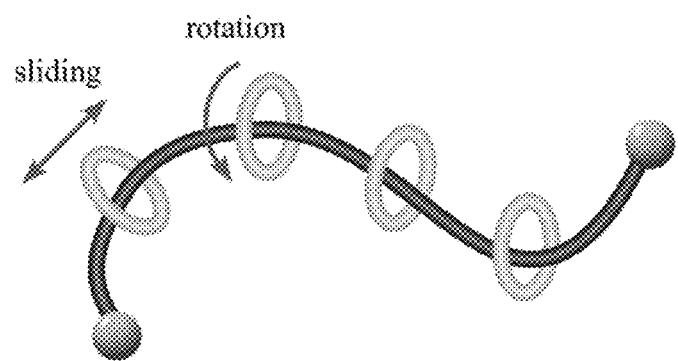
FIG. 1 is a schematic of a polyrotaxane.

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Materials that have the capacity to change their shape in response to external stimuli are of particular interest for applications in upstream oil and gas. For example, materials that can be used as lost circulation materials or for the mechanical reinforcement of sealants (such as oil well cement). Shape memory materials are active, stimuli-responsive materials that can have multiple shape positions. Shape memory materials have the ability to transition from an initial shape to a transitioned shape when an external stimulus is provided or applied. Shape memory materials can exhibit reversible shape changes that are induced by the external stimulus and can therefore exhibit a two-way effect.

The shape memory materials of the present disclosure have the ability to return to their original "memorized" shape after undergoing a shape deformation. Shape memory materials that have been preformed can be deformed to any desired shape below or above the glass transition temperature ($T_g$). The shape memory material must remain below, or be quenched to below, the $T_g$ while maintained in the desired deformed shape to "lock" in the deformation. Once the deformation is locked in, the material cannot return to a relaxed state due to thermal barriers. The shape memory material will hold its deformed shape indefinitely until it is heated above its $T_g$, where the stored mechanical strain is released and the shape memory material returns to its preformed state.

Provided in the present disclosure are shape memory compositions (materials) that are able to undergo reversible shape changes. The shape memory materials of the present disclosure are stimuli-responsive materials. The shape memory functionality of the compositions of the present disclosure refers to the ability of the material to transition from a first shape to a second shape after application of an external stimulus. This occurrence can be considered a functionality that results from a combination of material structure and the particular processes, as opposed to an inherent material property. Examples of external stimuli include, but are not limited to, temperature, pressure, chemical environment, and light.

Thus, the present disclosure provides shape memory compositions containing a thermally-curable epoxy resin and a sliding-ring polymer (polyrotaxane) additive. In some embodiments, the polyrotaxane additive enhances the mechanical properties of the shape memory composition. In some embodiments, incorporation of the polyrotaxane into the epoxy resin allows for shape and structural changes of the resin in response to mechanical or thermal stimuli.

The shape memory compositions of the present disclosure contain sliding-ring polymer additives that include chemical structures called polyrotaxanes. In some embodiments, the polyrotaxanes are made up of a linear polymer, a modified or substituted ring compound, and stopper groups on the end terminals of the linear polymer. In some embodiments, at least two molecules of the polyrotaxane are cross-linked to each other through a chemical bond. In some embodiments, the polyrotaxane forms a necklace-like structure. In some embodiments, the cyclic ring rotates, slides, or a combination thereof, upon application of external forces. In some embodiments, the rotation, sliding, or combination thereof provides for structural rearrangements. The cross-linked mechanical bond is movable, which allows the polymer chains to slide within the material. This is unlike conventional polymeric additives that contain permanently-linked covalent bonds that restrict the motion of the polymer chains. In some embodiments, the polyrotaxane additives have chemical bonds and crosslinking that do not break down upon repeated cycling of stresses, such as due to the uneven distribution of the stresses.

Without wishing to be bound by any particular theory, it is believed that the functional groups on the surface of the ring compounds, for example, hydroxyl groups (—OH) or epoxide groups on a cyclodextrin, allow for strong bonding between polymer matrix particles and the sliding-ring polymers, providing a strong interface within the polymer matrix. Furthermore, mechanical linkages (movement of ring components within polymeric networks) facilitate distribution of forces unlike chemical linkages (restricted movement of polymer chains in polymer networks) where cleavage of bonds can occur due to repeated cycles of forces.

Definitions

Unless otherwise defined, all technical and scientific terms used in this document have the same meaning as commonly understood by one of ordinary skill in the art to which the present application belongs. Methods and materials are described in this document for use in the present application; other, suitable methods and materials known in the art can also be used. The materials, methods, and examples are illustrative only and not intended to be limiting. All publications, patent applications, patents, sequences, database entries, and other references mentioned in this document are incorporated by reference in their entirety. In case of conflict, the present specification, including definitions, will control.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, and 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

The term "about," as used in this disclosure, can allow for a degree of variability in a value or range, for example, within 10%, within 5%, or within 1% of a stated value or of a stated limit of a range.

As used in this disclosure, the terms "a," "an," and "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In the methods described in this disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

As used herein, the term "polyrotaxane" refers to a compound having cyclic molecules, a linear molecule included in the cyclic molecules such that the linear molecule is threaded through the cyclic molecules. In some embodiments, there are stopper groups disposed at both ends of the linear molecule so as to prevent the cyclic molecules from separating from the linear molecule. The cyclic molecules can move along the axle.

The terms "shape memory material" or "shape memory composition" as used herein refer to a material which can be transformed by means of suitable shaping processes from a given permanent shape into a temporary shape and fixed as such. When applying an external stimulus, the material will return to the original, permanent shape. The transition from the temporary shape into the permanent shape is referred to as "recovery."

As used in this disclosure, the term "subterranean formation" can refer to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region that is in fluid contact with the wellbore. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground that is in fluid contact with liquid or gaseous petroleum materials or water. In some embodiments, a subterranean formation is an oil well.

Shape Memory Compositions Containing Sliding-Ring Polymers

Provided in this disclosure is a shape memory composition containing a thermally-curable epoxy resin and a sliding-ring polymer additive. In some embodiments, the sliding-ring polymer additive is a sliding-ring polymer additive of the present disclosure. In some embodiments, the shape memory composition exhibits shape memory behavior, such as being deformable and reformable in response to external stimuli.

Sliding-Ring Polymer Additives

Sliding-ring polymers, or polyrotaxanes, are a class of supramolecules with mechanically interlocked molecular systems and functional ends. They consist of one or more rings and one or to more strings, where the dissociation of a ring from a string is hindered by bulky groups (so-called stoppers) at both ends of the strings. In some embodiments, the ring compound is a cyclodextrin. Cyclodextrins (CDs) are a family of macrocyclic oligosaccharides, the most common of which are composed of 6 (α), 7 (β), or 8 (γ) α-1,4-linked D-glucopyranose units. CDs have amphiphilic properties, where the inside cavity of the CDs is hydrophobic, and the outside is hydrophilic because of all the hydroxyl groups located outward of the CDs. Owing to these mismatched characteristics in a cyclic molecule, CDs can be employed to form the host-guest assemblies.

A wide variety of less hydrophilic compounds can be accommodated in the cavity of CDs. The linear polymer chains, for example, polyethylene glycol, polypropylene glycol, or polysiloxanes, can be employed to generate host-guest complexes or inclusion complexes. Another important feature of inclusion complex formation is the selectivity based on the host-guest chemistry between backbone polymers and cyclic moieties. For example, polyethylene glycol yields pseudopolyrotaxanes with α-CD, while polypropylene glycol forms pseudopolyrotaxanes with β-CD. Likewise, bulkier polysiloxanes can generate inclusion complexes with γ-CD. This means that the optimal size fitting between the outside diameter of the backbone strings and the inside diameter of the rings is important in the formation of inclusion complex, which also supports the threading of CDs onto various backbone polymers.

In some embodiments, the reaction kinetics of the formation of inclusion complexes are assisted by the strong hydrogen bonds between adjacent ring-type compounds, such as cyclodextrins. This tends to yield a polyrotaxane of the full inclusion or filling ratio, where the backbone polymer is covered almost fully with cyclodextrins. In some embodiments, the filling ratio of polyrotaxane is dependent on the backbone polymer species, the length of the polymer string, the end groups of the string, the type and concentration of cyclodextrins, and the solvent and temperature during inclusion formation. In some embodiments, the cyclodextrins and linear polymers are dissolved in aqueous media that results in the formation of an inclusion complex or pseudopolyrotaxanes. Subsequent attachment of caps generates the polyrotaxanes (FIG. 1). In this structure, the movement and rotation of cyclic molecules can be possible upon external stimuli which facilitate the distribution of stresses within the materials, thereby restricting the molecular cleavage within the polymer networks.

Polyrotaxanes are distinct from traditional polymers and elastomeric additives. Traditional additives typically have a chemistry that is dependent upon strong covalent bonding while polyrotaxanes have both mechanical bonds and chemical bonds within polymeric networks. In traditional polymeric additives, chemical bonds/crosslinks break down upon repeated cycling of stresses due to the uneven distribution of the stresses. Since the stresses are concentrated on the shorter molecular chains, these chains lose strength effectiveness over a period of time. The polyrotaxane additives of the present disclosure contain pulley-like crosslinks in its polymeric network. The elegance of the pulley principle is demonstrated on the macroscopic scale by observing that the force required to lift an object directly and without a pulley is greater than the force required to lift the same object with a system of pulleys. The incorporation of molecular pulleys within this additive has an analogous effect.

Figure 2:
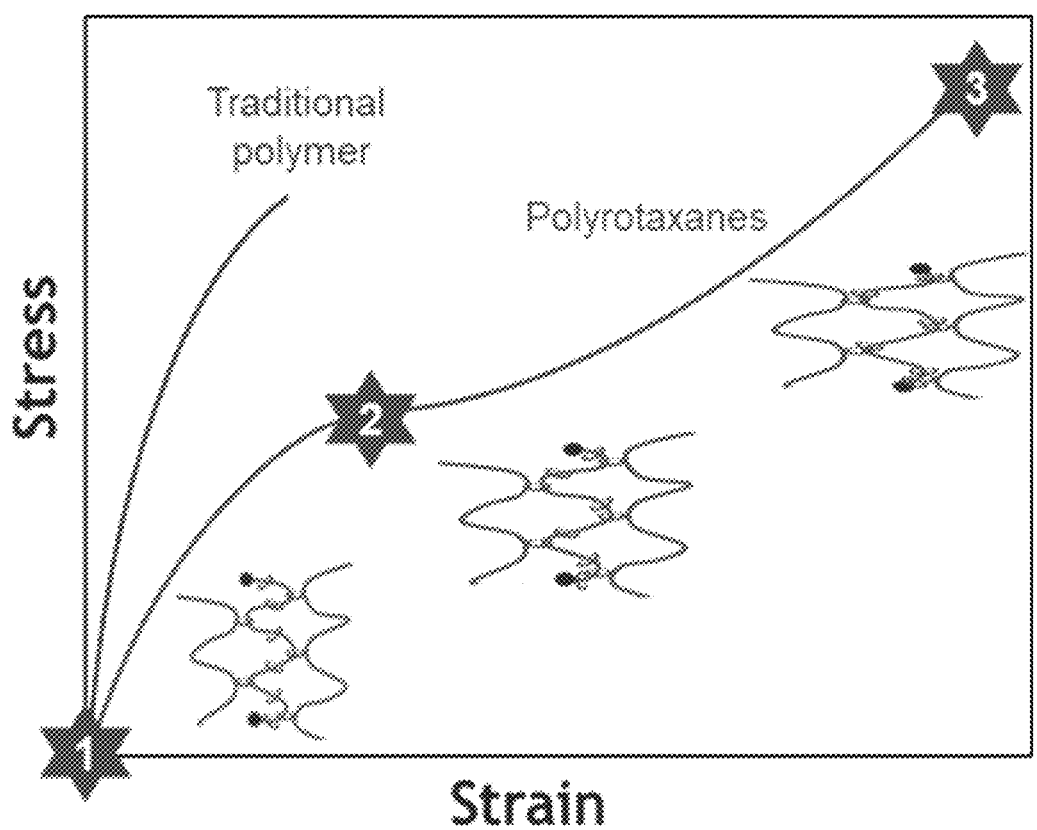
FIG. 2 shows a comparison of stress-strain curves of traditional polymer and polyrotaxane additives.

A comparison of solid-state properties of a traditional polymer and the polyrotaxane additives of the present disclosure is shown in FIG. 2, which is a stress-strain diagram of traditional polymers where yield point at a certain stress is defined. In the case of polyrotaxanes, two zones are observed—one that resembles traditional polymers and another that is distinctly different. The stress-strain curve between points 2 and 3 is similar to the stress-strain curve that is observed in artillery walls or spider silk. More than five-fold strain with the same amount of stress is observed in polyrotaxanes when compared with traditional polymers. A gram of this material is reinforced with many billions of molecular pulleys, which are designed to redistribute load. When forces are applied to this type of mechanically linked polymer network, the stress is not concentrated on short linkages; rather, it is uniformly distributed throughout the matrix. Thus, these sliding motions at the molecular level act as molecular machines in the matrix and enable unprecedented elastic behavior.

Provided in this disclosure are sliding-ring polymer additives that are made up of at least two molecules of a polyrotaxane that are cross-linked to each other through a chemical bond, where the polyrotaxane contains a linear polymer and at least one ring compound, where the linear polymer is threaded through the opening of the ring compound, and stopper groups disposed at both end terminals of the linear polymer. In some embodiments, at least one of the linear polymer and the ring compound is substituted with a hydrophobic or non-ionic group or combination thereof.

Any sliding-ring polymer known in the art can be used as an additive in the shape memory compositions of the present disclosure. For example, any sliding-ring polymer that improves the elastic properties of a polymeric matrix material, such as an epoxy resin, can be used. In some embodiments, the sliding-ring polymer additive is a sliding-ring polymer additive as described in the present disclosure, for example, a sliding-ring polymer additive that includes at least two molecules of a polyrotaxane that are made up of a linear polymer, at least one ring compound, and stopper groups disposed at the end terminals of the linear polymer. In some embodiments, the sliding-ring polymer additive is an additive or polyrotaxane moiety as described in any one of U.S. Pat. Nos. 7,612,142; 7,622,527; 7,799,867; 7,847,049; 7,893,168; 7,943,718; 7,981,943; 8,007,911; 8,450,415; 8,580,906; 9,068,051; and 9,266,972; each of which is incorporated by reference in its entirety.

Commercially available sliding-ring polymers can also be used in the shape memory compositions of the present disclosure. In some embodiments, the sliding-ring polymer additive is a sliding-ring polymer or polyrotaxane manufactured by Nagase America Corporation (New York, New York). Other examples of commercially available sliding-ring polymer additives are sliding-ring polymers or polyrotaxanes manufactured by Advanced Softmaterials Inc. (Chiba, Japan).

Linear Polymers

The linear polymer that can be included in a polyrotaxane can be any linear polymer that can be included in a ring compound such that the linear polymer is threaded through the opening of the ring compound. Any linear polymer that can be threaded through the opening of a ring compound can be included in a polyrotaxane. Examples of such linear polymers include those described in any one of U.S. Pat. Nos. 7,612,142; 7,622,527; 7,799,867; 7,847,049; 7,893,168; 7,943,718; 7,981,943; 8,007,911; 8,450,415; 8,580,906; 9,068,051; and 9,266,972; each of which is incorporated by reference in its entirety.

Examples of suitable linear polymers include, but are not limited to, polyvinyl alcohol, polyvinylpyrrolidone, poly(methacrylic acid), cellulose-based resins (for example, carboxymethylcellulose, hydroxyethylcellulose, and hydroxypropylcellulose), polyacrylamide, polyethylene oxide, polyethylene glycol, polypropylene glycol, polyvinyl acetal-based resins, polyvinyl methyl ether, polyamine, polyethyleneimine, casein, gelatin, starch and copolymers thereof, polyolefin-based resins (for example, polyethylene, polypropylene, and copolymer resins with other olefinic monomers), polyester resins, polyvinyl chloride resins, polystyrene-based resins (for example, polystyrene and acrylonitrile-styrene copolymer resin), acrylic resins (for example, polymethyl methacrylate, copolymers of methacrylate, acrylonitrile-methyl acrylate copolymer resin), polycarbonate resins, polyurethane resins, vinyl chloride-vinyl acetate copolymer resin, polyvinylbutyral resin, polyisobutylene, polytetrahydrofuran, polyaniline, acrylonitrile-butadiene-styrene copolymer (ABS resin), polyamides (for example, nylon), polyimides, polydienes (for example, polyisoprene and polybutadiene), polysiloxanes (for example, polydimethylsiloxane), polysulfones, polyimines, polyacetic anhydrides, polyureas, polysulfides, polyphosphazenes, polyketones, polyphenylenes, polyhaloolefins; and copolymers and derivatives thereof. In some embodiments, the linear polymer is selected from the group consisting of polypropylene glycol, polytetrahydrofuran, polydimethylsiloxane, polyethylene and polypropylene. In some embodiments, the linear polymer is polyethylene glycol. In some embodiments, the linear polymer is polypropylene glycol. In some embodiments, the linear polymer is a polysiloxane.

In some embodiments, the linear molecule has a molecular weight of about 2000 g/mol to about 50,000 g/mol, for example, about 2000 g/mol to about 45,000 g/mol, about 2000 g/mol to about 40,000 g/mol, about 2000 g/mol to about 35,000 g/mol, about 2000 g/mol to about 30,000 g/mol, about 2000 g/mol to about 25,000 g/mol, about 2000 g/mol to about 20,000 g/mol, about 2000 g/mol to about 15,000 g/mol, about 2000 g/mol to about 10,000 g/mol, about 2000 g/mol to about 8000 g/mol, about 2000 g/mol to about 5000 g/mol, about 5000 g/mol to about 50,000 g/mol, about 5000 g/mol to about 45,000 g/mol, about 5000 g/mol to about 40,000 g/mol, about 5000 g/mol to about 35,000 g/mol, about 5000 g/mol to about 30,000 g/mol, about 5000 g/mol to about 25,000 g/mol, about 5000 g/mol to about 20,000 g/mol, about 5000 g/mol to about 15,000 g/mol, about 5000 g/mol to about 10,000 g/mol, about 5000 g/mol to about 8000 g/mol, about 8000 g/mol to about 50,000 g/mol, about 8000 g/mol to about 45,000 g/mol, about 8000 g/mol to about 40,000 g/mol, about 8000 g/mol to about 35,000 g/mol, about 8000 g/mol to about 30,000 g/mol, about 8000 g/mol to about 25,000 g/mol, about 8000 g/mol to about 20,000 g/mol, about 8000 g/mol to about 15,000 g/mol, about 8000 g/mol to about 10,000 g/mol, about 10,000 g/mol to about 50,000 g/mol, about 10,000 g/mol to about 45,000 g/mol, about 10,000 g/mol to about 40,000 g/mol, about 10,000 g/mol to about 35,000 g/mol, about 10,000 g/mol to about 30,000 g/mol, about 10,000 g/mol to about 25,000 g/mol, about 10,000 g/mol to about 20,000 g/mol, about 10,000 g/mol to about 15,000 g/mol, about 15,000 g/mol to about 50,000 g/mol, about 15,000 g/mol to about 45,000 g/mol, about 15,000 g/mol to about 40,000 g/mol, about 15,000 g/mol to about 35,000 g/mol, about 15,000 g/mol to about 30,000 g/mol, about 15,000 g/mol to about 25,000 g/mol, about 15,000 g/mol to about 20,000 g/mol, about 20,000 g/mol to about 50,000 g/mol, about 20,000 g/mol to about 45,000 g/mol, about 20,000 g/mol to about 40,000 g/mol, about 20,000 g/mol to about 35,000 g/mol, about 20,000 g/mol to about 30,000 g/mol, about 20,000 g/mol to about 25,000 g/mol, about 25,000 g/mol to about 50,000 g/mol, about 25,000 g/mol to about 45,000 g/mol, about 25,000 g/mol to about 40,000 g/mol, about 25,000 g/mol to about 35,000 g/mol, about 25,000 g/mol to about 30,000 g/mol, about 30,000 g/mol to about 50,000 g/mol, about 30,000 g/mol to about 45,000 g/mol, about 30,000 g/mol to about 40,000 g/mol, about 30,000 g/mol to about 35,000 g/mol, about 35,000 g/mol to about 50,000 g/mol, about 35,000 g/mol to about 45,000 g/mol, about 35,000 g/mol to about 40,000 g/mol, about 40,000 g/mol to about 50,000 g/mol, about 40,000 g/mol to about 45,000 g/mol, about 45,000 g/mol to about 50,000 g/mol, or about 2000 g/mol, about 5000 g/mol, about 8000 g/mol, about 10,000 g/mol, about 15,000 g/mol, about 20,000 g/mol, about 25,000 g/mol, about 30,000 g/mol, about 35,000 g/mol, about 40,000 g/mol, about 45,000 g/mol, or about 50,000 g/mol. In some embodiments, the molecular weight of the linear molecule is about 2000 g/mol to about 50,000 g/mol. In some embodiments, the molecular weight of the linear molecule is about 8000 g/mol to about 30,000 g/mol. In some embodiments, the molecular weight of the linear molecule is about 15,000 g/mol to about 25,000 g/mol. In some embodiments, the molecular weight of the linear molecule is greater than about 10,000 g/mol. In some embodiments, the molecular weight of the linear molecule is greater than about 20,000 g/mol. In some embodiments, the molecular weight of the linear molecule is greater than about 35,000 g/mol.

Ring Compounds

The ring compound that can be included in a polyrotaxane can be any ring compound that allows for threading of a linear polymer through the opening of the ring. Examples of such ring compounds include those described in any one of U.S. Pat. Nos. 7,612,142; 7,622,527; 7,799,867; 7,847,049; 7,893,168; 7,943,718; 7,981,943; 8,007,911; 8,450,415; 8,580,906; 9,068,051; and 9,266,972; each of which is incorporated by reference in its entirety.

In some embodiments, the ring compound is a cyclodextrin or a cyclodextrin derivative. Examples of suitable ring compounds include, but are not limited to, α-cyclodextrin (α-CD), β-cyclodextrin (β-CD), γ-cyclodextrin (γ-CD), and derivatives thereof. Cyclodextrin derivatives are compounds obtained by substituting hydroxyl groups of cyclodextrin with polymer chains, substituents, or both. Examples of suitable polymer chains include, but are not limited to, polyethylene glycol, polypropylene glycol, polyethylene, polypropylene, polyvinyl alcohol, polyacrylate, polylactone, and polylactam. Examples of suitable substituents include, but are not limited to, hydroxyl, thionyl, amino, sulfonyl, phosphonyl, acetyl, alkyl groups (for example, methyl, ethyl, propyl, and isopropyl), trityl, tosyl, trimethylsilane, and phenyl.

Examples of suitable cyclodextrin and cyclodextrin derivatives include, but are not limited to, α-cyclodextrin (the number of glucose residues=6, inner diameter of opening=about 0.45 to 0.6 μm), β-cyclodextrin (the number of glucose residues=7, inner diameter of opening=about 0.6 to 0.8 μm), γ-cyclodextrin (the number of glucose residues=8, inner diameter of opening=about 0.8 to 0.95 μm), dimethyl cyclodextrin, glucosyl cyclodextrin, 2-hydroxypropyl-α-cyclodextrin, 2,6-di-O-methyl-α-cyclodextrin 6-O-α-maltosyl-α-cyclodextrin, 6-O-α-D-glucosyl-α-cyclodextrin, hexakis(2,3,6-tri-O-acetyl)-α-cyclodextrin, hexakis(2,3,6-tri-O-methyl)-α-cyclodextrin, hexakis(6-O-tosyl)-α-cyclodextrin, hexakis(6-amino-6-deoxy)-α-cyclodextrin, hexakis(2,3-acetyl-6-bromo-6-deoxy)-α-cyclodextrin, hexakis(2,3,6-tri-O-octyl)-α-cyclodextrin, mono(2-O-phosphoryl)-α-cyclodextrin, mono[2,(3)-O-(carboxylmethyl)]-α-cyclodextrin, octakis(6-O-t-butyldimethylsilyl)-α-cyclodextrin, succinyl-α-cyclodextrin, glucuronyl glucosyl-β-cyclodextrin, heptakis (2,6-di-O-methyl)-β-cyclodextrin, heptakis(2,6-di-O-ethyl)-β-cyclodextrin, heptakis(6-O-sulfo)-β-cyclodextrin, heptakis(2,3-di-O-acetyl-6-O-sulfo)β-cyclodextrin, heptakis(2,3-di-O-methyl-6-O-sulfo)-β-cyclodextrin, heptakis(2,3,6-tri-O-acetyl)-β-cyclodextrin, heptakis(2,3,6-tri-O-benzoyl)-β-cyclodextrin, heptakis(2,3,6-tri-O-methyl)β-cyclodextrin, heptakis(3-O-acetyl-2,6-di-O-methyl)-β-cyclodextrin, heptakis(2,3-O-acetyl-6-bromo-6-deoxy)-β-cyclodextrin, 2-hydroxyethyl-β-cyclodextrin, hydroxypropyl-β-cyclodextrin, 2-hydroxypropyl-β-cyclodextrin, (2-hydroxy-3-N,N,N-trimethylamino)propyl-β-cyclodextrin, 6-O-α-maltosyl-β-cyclodextrin, methyl-β-cyclodextrin, hexakis(6-amino-6-deoxy)-β-cyclodextrin, bis(6-azido-6-deoxy)-β-cyclodextrin, mono(2-O-phosphoryl)-β-cyclodextrin, hexakis[6-deoxy-6-(1-imidazolyl)]-β-cyclodextrin, monoacetyl-β-cyclodextrin, triacetyl-β-cyclodextrin, monochlorotriazinyl-β-cyclodextrin, 6-O-α-D-glucosyl-β-cyclodextrin, 6-O-α-D-maltosyl-β-cyclodextrin, succinyl-β-cyclodextrin, succinyl-(2-hydroxypropyl)β-cyclodextrin, 2-carboxymethyl-β-cyclodextrin, 2-carboxyethyl-β-cyclodextrin, butyl-β-cyclodextrin, sulfopropyl-β-cyclodextrin, 6-monodeoxy-6-monoamino-β-cyclodextrin, silyl[(6-O-t-butyldimethyl)2,3-di-O-acetyl]-O-cyclodextrin, 2-hydroxyethyl-γ-cyclodextrin, 2-hydroxypropyl-γ-cyclodextrin, butyl-γ-cyclodextrin, 3A-amino-3A-deoxy-(2AS,3AS)-γ-cyclodextrin, mono-2-O-(p-toluenesulfonyl)-γ-cyclodextrin, mono-6-O-(p-toluenesulfonyl)-γ-cyclodextrin, mono-6-O-mesitylenesulfonyl-γ-cyclodextrin, octakis(2,3,6-tri-O-methyl)-γ-cyclodextrin, octakis(2,6-di-O-phenyl)-γ-cyclodextrin, octakis(6-O-t-butyldimethylsilyl)-γ-cyclodextrin, and octakis(2,3,6-tri-O-acetyl)-γ-cyclodextrin. The ring compounds, such as the cyclodextrins listed in the present disclosure, can be used alone or in combination of two or more.

Figure 3A:
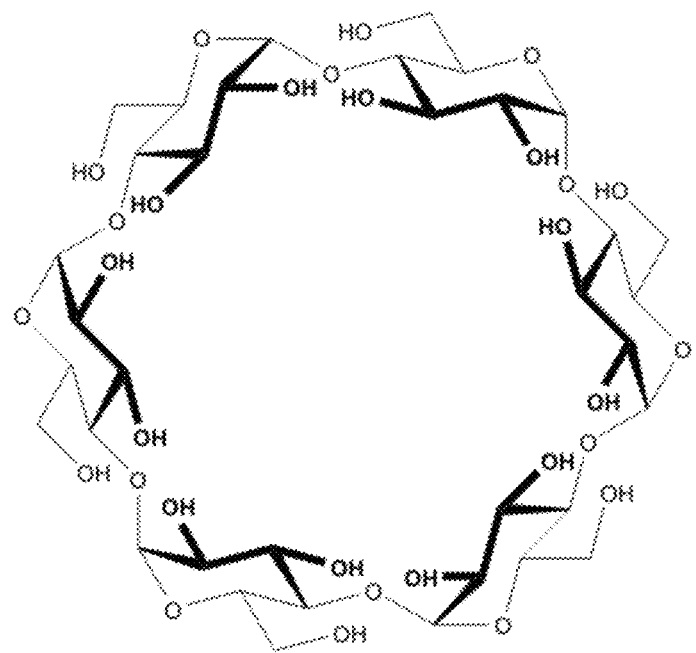
FIGS. 3A-3C depict the structures of exemplary cyclodextrin compounds α-cyclodextrin (α-CD.
Figure 3B:
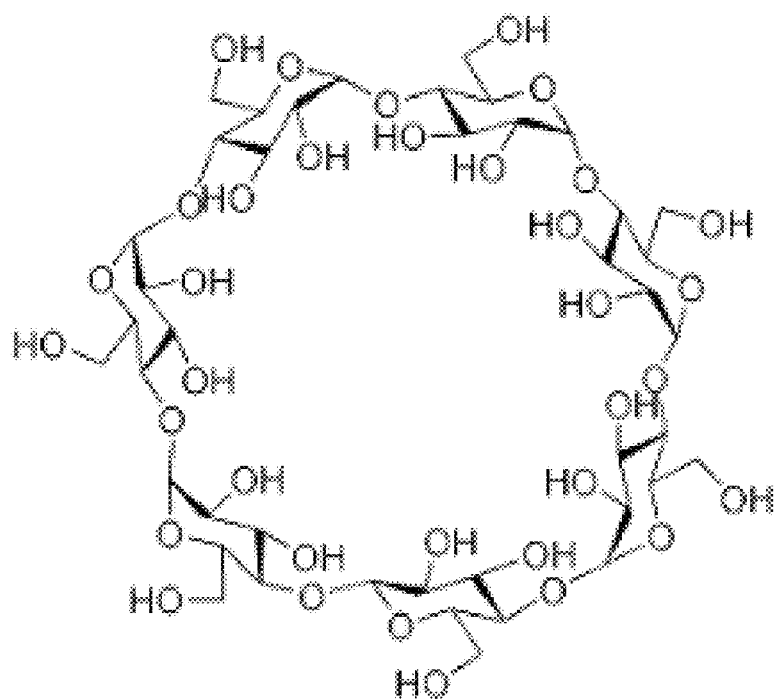
Figure 3C:
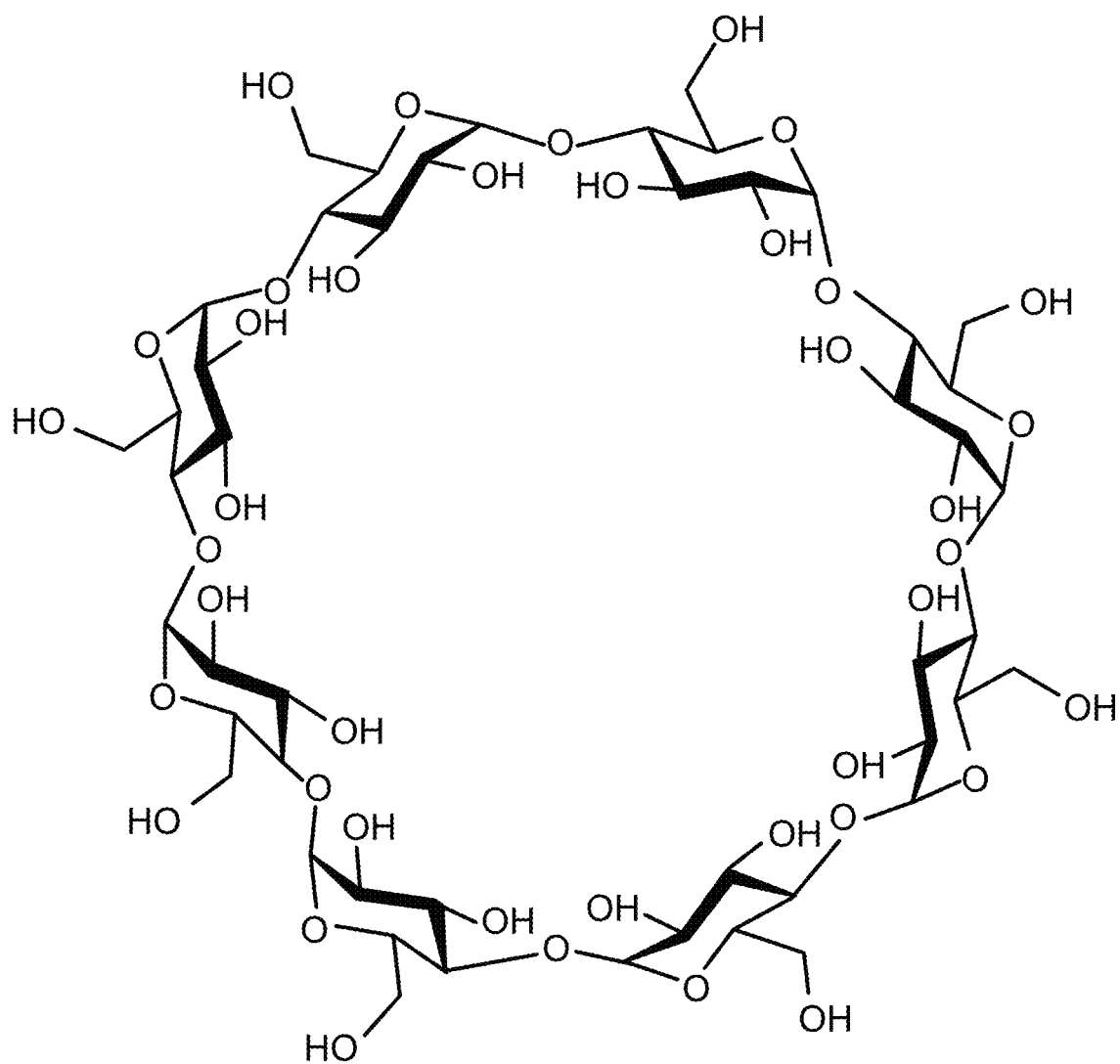

In some embodiments, the ring compound is α-cyclodextrin having the structure shown in FIG. 3A. In some embodiments, the ring compound is β-cyclodextrin having the structure shown in FIG. 3B. In some embodiments, the ring compound is γ-cyclodextrin having the structure shown in FIG. 3C.

In some embodiments, the amount of ring compound, for example, a cyclodextrin or cyclodextrin derivative, on the polymer chain is about 2 wt % to about 60 wt %, such as about 2 wt % to about 55 wt %, about 2 wt % to about 50 wt %, about 2 wt % to about 45 wt %, about 2 wt % to about 40 wt %, about 2 wt % to about 35 wt %, about 2 wt % to about 30 wt %, about 2 wt % to about 25 wt %, about 2 wt % to about 20 wt %, about 2 wt % to about 15 wt %, about 2 wt % to about 10 wt %, about 2 wt % to about 5 wt %, about 5 wt % to about 60 wt %, about 5 wt % to about 55 wt %, about 5 wt % to about 50 wt %, about 5 wt % to about 45 wt %, about 5 wt % to about 40 wt %, about 5 wt % to about 35 wt %, about 5 wt % to about 30 wt %, about 5 wt % to about 25 wt %, about 5 wt % to about 20 wt %, about 5 wt % to about 15 wt %, about 5 wt % to about 10 wt %, about 10 wt % to about 60 wt %, about 10 wt % to about 55 wt %, about 10 wt % to about 50 wt %, about 10 wt % to about 45 wt %, about 10 wt % to about 40 wt %, about 10 wt % to about 35 wt %, about 10 wt % to about 30 wt %, about 10 wt % to about 25 wt %, about 10 wt % to about 20 wt %, about 10 wt % to about 15 wt %, about 15 wt % to about 60 wt %, about 15 wt % to about 55 wt %, about 15 wt % to about 50 wt %, about 15 wt % to about 45 wt %, about 15 wt % to about 40 wt %, about 15 wt % to about 35 wt %, about 15 wt % to about 30 wt %, about 15 wt % to about 25 wt %, about 15 wt % to about 20 wt %, about 20 wt % to about 60 wt %, about 20 wt % to about 55 wt %, about 20 wt % to about 50 wt %, about 20 wt % to about 45 wt %, about 20 wt % to about 40 wt %, about 20 wt % to about 35 wt %, about 20 wt % to about 30 wt %, about 20 wt % to about 25 wt %, about 25 wt % to about 60 wt %, about 25 wt % to about 55 wt %, about 25 wt % to about 50 wt %, about 25 wt % to about 45 wt %, about 25 wt % to about 40 wt %, about 25 wt % to about 35 wt %, about 25 wt % to about 30 wt %, about 30 wt % to about 60 wt %, about 30 wt % to about 55 wt %, about 30 wt % to about 50 wt %, about 30 wt % to about 45 wt %, about 30 wt % to about 40 wt %, about 30 wt % to about 35 wt %, about 35 wt % to about 60 wt %, about 35 wt % to about 55 wt %, about 35 wt % to about 50 wt %, about 35 wt % to about 45 wt %, about 35 wt % to about 40 wt %, about 40 wt % to about 60 wt %, about 40 wt % to about 55 wt %, about 40 wt % to about 50 wt %, about 40 wt % to about 45 wt %, about 45 wt % to about 60 wt %, about 45 wt % to about 55 wt %, about 45 wt % to about 50 wt %, about 50 wt % to about 60 wt %, about 50 wt % to about 55 wt %, about 55 wt % to about 60 wt %, or about 2 wt %, about 5 wt %, about 10 wt %, about 15 wt %, about 20 wt %, about 25 wt %, about 30 wt %, about 35 wt %, about 40 wt %, about 45 wt %, about 50 wt %, about 55 wt %, or about 60 wt %. In some embodiments, the amount of ring compound, for example, a cyclodextrin or cyclodextrin derivative, on the polymer chain is about 2 wt % to about 60 wt %. In some embodiments, the amount of ring compound, for example, a cyclodextrin or cyclodextrin derivative, on the polymer chain is about 10 wt % to about 50 wt %. In some embodiments, the amount of ring compound, for example, a cyclodextrin or cyclodextrin derivative, on the polymer chain is about 25 wt % to about 35 wt %.

Hydrophobic and Non-Ionic Groups

In some embodiments, at least one of the linear polymer and the ring compound is substituted (or modified) with a hydrophobic group or a non-ionic group or a combination thereof. The hydrophobic and non-ionic groups can be any group that can modify or be substituted onto a linear polymer or ring compound. Examples of such groups include those described in any one of U.S. Pat. Nos. 7,612,142; 7,622,527; 7,799,867; 7,847,049; 7,893,168; 7,943,718; 7,981,943; 8,007,911; 8,450,415; 8,580,906; 9,068,051; and 9,266,972; each of which is incorporated by reference in its entirety.

In some embodiments, at least one of the linear polymer and ring compound is substituted with a hydrophobic group. Examples of suitable hydrophobic groups include, but are not limited to, alkyl group, benzyl group, benzene derivative-containing group, acyl group, silyl group, trityl group, tosyl group, a polymer, and groups bonded through a urethane bond, ester bond or ether bond. In some embodiments, the polymer is a polycaprolactone.

In some embodiments, at least one of the linear polymer and ring compound is substituted with a non-ionic group. In some embodiments, the non-ionic group is selected from the group consisting of: an —OR group, wherein R is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons; an —O—R'—X group, wherein R' is a group resulting from removal of one hydrogen in a linear or branched alkyl group having 1-12 carbons, a group resulting from removal of one hydrogen in a linear or branched alkyl group having 2-12 carbons and at least one ether group, a group resulting from removal of one hydrogen in a cycloalkyl group having 3-12 carbons, a group resulting from removal of one hydrogen in a cycloalkyl ether group having 2-12 carbons or a group resulting from removal of one hydrogen in a cycloalkyl thioether group having 2-12 carbons, and X is —OH, —NH$_2$ or —SH; an —O—CO—NH—R$^1$ group, wherein R$^1$ is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons; an —O—CO—R$^2$ group, wherein R$^2$ is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons; an —O—Si—R$^3$ group, wherein R$^3$ is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons; and an —O—CO—O—R$^4$ group, wherein R$^4$ is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

In some embodiments, R is selected from acrylate, methacrylate, amine, thiol, isocyanate, azide, hydroxyl, hydrogen, styrene, and combinations thereof.

Examples of R, R', R$^1$, R$^2$, R$^3$, and R$^4$ groups include, but are not limited to, alkyl groups such as methyl, ethyl, propyl, butyl, pentyl, hexyl, heptyl, octyl, nonyl, decyl, undecyl, and dodecyl; branched alkyl groups such as isopropyl, isobutyl, tert-butyl, 1-methylpropyl, isoamyl, neopentyl, 1,1-dimethylpropyl, 4-methylpentyl, 2-methylbutyl, and 2-ethylhexyl; cycloalkyl groups such as cyclopropyl, cyclobutyl, cyclopentyl, cyclohexyl, cycloheptyl, cyclooctyl, and adamantyl; cycloalkyl ether groups such as ethylene oxide, oxetane, tetrahydrofuran, tetrahydropyrane, oxepane, dioxane, and dioxolane; and cycloalkyl thioether groups such as thiirane, thietane, tetrahydrothiophene, thiane, dithiolane, and dithiane. In some embodiments, R' is a group resulting from removal of one hydrogen, for example, R' can be a group resulting from removal of one hydrogen in methyl, ethyl, propyl, butyl, pentyl or hexyl.

In some embodiments, the ring compound is substituted with a hydrophobic group, a non-ionic group, or combinations thereof. In some embodiments, the ring compound is a cyclodextrin. In some embodiments, a part or all of the hydroxyl groups (—OH) of the cyclodextrin are substituted with a hydrophobic group or non-ionic group or combination thereof. In some embodiments, a part or all of the hydroxyl groups (—OH) of the cyclodextrin are substituted with a polycaprolactone, a hydroxypropyl group, or both. In some embodiments, substitution of the hydroxyl group with the hydrophobic group or non-ionic group or combination thereof is about 10% to about 100% of the total hydroxyl groups of the total cyclodextrin molecules.

Amount of Inclusion

In some embodiments, where a plurality of ring compounds include a linear polymer such that the linear polymer is threaded through the ring compounds, when the maximum amount of inclusion of one linear polymer in the ring compound is 1, the ring compounds can include the linear polymer in an amount of 0.001 to 0.6, such as 0.01 to 0.5, or 0.05 to 0.4.

The maximum amount of inclusion in the ring compounds can be calculated from the length of the linear polymer and the thickness of the ring compounds. For example, when the linear polymer is polyethylene glycol and the ring compounds are α-cyclodextrin molecules, the maximum amount of inclusion has been experimentally determined (see, for example, Macromolecules (1993) 26:5698-5703).

Stopper Group

The polyrotaxane of the sliding-ring polymer includes stopper groups disposed at both end terminals of the linear polymer. The stopper groups can be any group that is disposed at the ends of a linear polymer and acts to prevent separation of the ring compounds. Examples of such stopper groups include those described in any one of U.S. Pat. Nos. 7,612,142; 7,622,527; 7,799,867; 7,847,049; 7,893,168; 7,943,718; 7,981,943; 8,007,911; 8,450,415; 8,580,906; 9,068,051; and 9,266,972; each of which is incorporated by reference in its entirety.

Examples of suitable stopper groups include, but are not limited to, dinitrophenyl groups; cyclodextrins; adamantane groups; trityl groups; fluoresceins; pyrenes; benzenes optionally substituted with one or more substituents including, but not limited to, alkyl, alkyloxy, hydroxy, halogen, cyano, sulfonyl, carboxyl, amino, and phenyl; polycyclic aromatics optionally substituted with one or more substituents including, but not limited to, alkyl, alkyloxy, hydroxy, halogen, cyano, sulfonyl, carboxyl, amino, and phenyl; and steroids. In some embodiments, the stopper group is selected from the group consisting of dinitrophenyl groups; cyclodextrins; adamantane groups; trityl groups; fluoresceins; and pyrenes. In some embodiments, the stopper group is adamantane. In some embodiments, the stopper group is trityl.

Cross-Linkers

In some embodiments, at least two molecules of polyrotaxane are chemically bonded by a cross-linking agent. Examples of suitable cross-linking agents include those described in any one of U.S. Pat. Nos. 7,612,142; 7,622,527; 7,799,867; 7,847,049; 7,893,168; 7,943,718; 7,981,943; 8,007,911; 8,450,415; 8,580,906; 9,068,051; and 9,266,972; each of which is incorporated by reference in its entirety.

Examples of suitable cross-linkers include, but are not limited to, melamine resins, polyisocyanate compounds, block isocyanate compounds, cyanuric chloride, trimesoyl chloride, terephthaloyl chloride, epichlorohydrin, dibromobenzene, formaldehyde, glutaraldehyde, phenylenediisocyanate, tolylene diisocyanate, divinylsulfone, bisphenol A diglycidyl ether, diisopropylethylenediamine, 1,1-carbonyldiimidazole, and alkoxy silanes. The cross-linkers can be used alone or in combination. In some embodiments, the cross-linker is selected from the group consisting of cyanuric chloride, trimesoyl chloride, terephthaloyl chloride, epichlorohydrin, dibromobenzene, glutaraldehyde, phenylene diisocyanates, tolylene diisocyanates, divinylsulfone, 1,1'-carbonyldiimidazole, and alkoxysilanes.

Linked polyrotaxanes

In some embodiments of the sliding-ring polymer additives that can be used in the shape memory compositions of the present disclosure, at least two molecules of polyrotaxane are cross-linked to each other through a chemical bond. When linking polyrotaxane molecules, all of the polyrotaxane molecules can be substituted with the same hydrophobic or non-ionic group. Alternatively, a part of the polyrotaxane molecules can be substituted with one hydrophobic or non-ionic group, and the rest of the polyrotaxane molecules can be substituted with a hydrophobic or non-ionic group that is different from the first group. In some embodiments, different molecules of polyrotaxane substituted with different hydrophobic or non-ionic groups can be physically linked.

In some embodiments, at least one hydroxyl group of at least one cyclic molecule in each of at least two molecules of polyrotaxane is involved in cross-linking. In some embodiments, at least two molecules of polyrotaxane are chemically bonded by a cross-linking agent.

Epoxy Resin

The shape memory compositions of the present application contain an epoxy resin. Epoxies are known for their exceptional mechanical properties for structural applications, but are rigid and brittle materials. In some embodiments, addition of the sliding-ring polymer additive of the present disclosure increases the toughness of the epoxy resin. In some embodiments, the epoxy resin is a thermally-curable epoxy resin. Any epoxy resin having epoxide groups can be employed as a thermally-curable resin. Any thermally-curable epoxy resin can be used in the shape memory compositions of the present disclosure. In some embodiments, the epoxy resin has aliphatic groups, aromatic groups, or a mixture thereof. An exemplary epoxy resin is EPON™ Resin 826, a low viscosity, light colored liquid bisphenol A based epoxy resin sold by Hexion Inc., Columbus, OH.

Additives

The shape memory compositions of the present disclosure can contain one or more additives. In some embodiments, the additive is a curing agent. Exemplary curing agents include etheramines and aliphatic and/or aromatic diamines, triamines, tetraamines, or mixtures thereof. An exemplary curing agent is JEFFAMINE® D-230 polyetheramine, a difunctional, primary amine with an average molecular weight of about 230 characterized by repeating oxypropylene units in the backbone, sold by Huntsman Corporation, The Woodlands, TX.

Shape Memory Composition

The shape memory compositions of the present application contain a thermally-curable epoxy resin and a sliding-ring polymer additive. In some embodiments, the shape memory compositions contain one or more additives. In some embodiments, the shape memory compositions contain a curing agent.

In some embodiments, the amount of epoxy resin in the shape memory composition is about 50 wt % to about 95 wt %, such as about 50 wt % to about 90 wt %, about 50 wt % to about 85 wt %, about 50 wt % to about 80 wt %, about 50 wt % to about 75 wt %, about 50 wt % to about 70 wt %, about 50 wt % to about 65 wt %, about 50 wt % to about 60 wt %, about 50 wt % to about 55 wt %, about 55 wt % to about 95 wt %, about 55 wt % to about 90 wt %, about 55 wt % to about 85 wt %, about 55 wt % to about 80 wt %, about 55 wt % to about 75 wt %, about 55 wt % to about 70 wt %, about 55 wt % to about 65 wt %, about 55 wt % to about 60 wt %, about 60 wt % to about 95 wt %, about 60 wt % to about 90 wt %, about 60 wt % to about 85 wt %, about 60 wt % to about 80 wt %, about 60 wt % to about 75 wt %, about 60 wt % to about 70 wt %, about 60 wt % to about 65 wt %, about 65 wt % to about 95 wt %, about 65 wt % to about 90 wt %, about 65 wt % to about 85 wt %, about 65 wt % to about 80 wt %, about 65 wt % to about 75 wt %, about 65 wt % to about 70 wt %, about 70 wt % to about 95 wt %, about 70 wt % to about 90 wt %, about 70 wt % to about 85 wt %, about 70 wt % to about 80 wt %, about 70 wt % to about 75 wt %, about 75 wt % to about 95 wt %, about 75 wt % to about 90 wt %, about 75 wt % to about 85 wt %, about 75 wt % to about 80 wt %, about 80 wt % to about 95 wt %, about 80 wt % to about 90 wt %, about 80 wt % to about 85 wt %, about 85 wt % to about 95 wt %, about 85 wt % to about 90 wt %, about 90 wt % to about 95 wt %, or about 50 wt %, about 55 wt %, about 60 wt %, about 65 wt %, about 70 wt %, about 75 wt %, about 80 wt %, about 85 wt %, about 90 wt %, or about 95 wt %. In some embodiments, the amount of epoxy resin in the shape memory composition is about 50 wt % to about 95 wt %. In some embodiments, the amount of epoxy resin in the shape memory composition is about 60 wt % to about 90 wt %. In some embodiments, the amount of epoxy resin in the shape memory composition is about 75 wt % to about 85 wt %. In some embodiments, the amount of epoxy resin in the shape memory composition is about 65 wt %. In some embodiments, the amount of epoxy resin in the shape memory composition is about 70 wt %. In some embodiments, the amount of epoxy resin in the shape memory composition is about 75 wt %. An exemplary epoxy resin is EPON™ Resin 826 (a low viscosity, light colored liquid bisphenol A based epoxy resin sold by Hexion Inc., Columbus, OH).

In some embodiments, the amount of sliding-ring polymer additive in the shape memory composition is about 1 wt % to about 30 wt %, such as about 1 wt % to about 25 wt %, about 1 wt % to about 20 wt %, about 1 wt % to about 15 wt %, about 1 wt % to about 10 wt %, about 1 wt % to about 5 wt %, about 5 wt % to about 30 wt %, about 5 wt % to about 25 wt %, about 5 wt % to about 20 wt %, about 5 wt % to about 15 wt %, about 5 wt % to about 10 wt %, about 10 wt % to about 30 wt %, about 10 wt % to about 25 wt %, about 10 wt % to about 20 wt %, about 10 wt % to about 15 wt %, about 15 wt % to about 30 wt %, about 15 wt % to about 25 wt %, about 15 wt % to about 20 wt %, about 20 wt % to about 30 wt %, about 20 wt % to about 25 wt %, about 25 wt % to about 30 wt %, or about 1 wt %, about 5 wt %, about 10 wt %, about 15 wt %, about 20 wt %, about 25 wt %, or about 30 wt %. In some embodiments, the amount of sliding-ring polymer additive in the shape memory composition is about 1 wt % to about 30 wt %. In some embodiments, the amount of sliding-ring polymer additive in the shape memory composition is about 1 wt % to about 25 wt %. In some embodiments, the amount of sliding-ring polymer additive in the shape memory composition is about 5 wt % to about 20 wt %. In some embodiments, the amount of sliding-ring polymer additive in the shape memory composition is about 10 wt % to about 15 wt %. In some embodiments, the amount of sliding-ring polymer additive in the shape memory composition is about 10 wt %. In some embodiments, the sliding-ring polymer additive is a cross-linked polyrotaxane bead. An exemplary cross-linked polyrotaxane bead is the one sold by Advanced Softmaterials (Japan).

In some embodiments, the shape memory composition contains an additive. In some embodiments, the additive is a curing agent. In some embodiments, the amount of additive in the shape memory composition is about 5 wt % to about 50 wt %, about 5 wt % to about 45 wt %, about 5 wt % to about 40 wt %, about 5 wt % to about 35 wt %, about 5 wt % to about 30 wt %, about 5 wt % to about 25 wt %, about 5 wt % to about 20 wt %, about 5 wt % to about 15 wt %, about 5 wt % to about 10 wt %, about 10 wt % to about 50 wt %, about 10 wt % to about 45 wt %, about 10 wt % to about 40 wt %, about 10 wt % to about 35 wt %, about 10 wt % to about 30 wt %, about 10 wt % to about 25 wt %, about 10 wt % to about 20 wt %, about 10 wt % to about 15 wt %, about 15 wt % to about 50 wt %, about 15 wt % to about 45 wt %, about 15 wt % to about 40 wt %, about 15 wt % to about 35 wt %, about 15 wt % to about 30 wt %, about 15 wt % to about 25 wt %, about 15 wt % to about 20 wt %, about 20 wt % to about 50 wt %, about 20 wt % to about 45 wt %, about 20 wt % to about 40 wt %, about 20 wt % to about 35 wt %, about 20 wt % to about 30 wt %, about 20 wt % to about 25 wt %, about 25 wt % to about 50 wt %, about 25 wt % to about 45 wt %, about 25 wt % to about 40 wt %, about 25 wt % to about 35 wt %, about 25 wt % to about 30 wt %, about 30 wt % to about 50 wt %, about 30 wt % to about 45 wt %, about 30 wt % to about 40 wt %, about 30 wt % to about 35 wt %, about 35 wt % to about 50 wt %, about 35 wt % to about 45 wt %, about 35 wt % to about 40 wt %, about 40 wt % to about 50 wt %, about 40 wt % to about 45 wt %, about 45 wt % to about 50 wt %, or about 5 wt %, about 10 wt %, about 15 wt %, about 20 wt %, about 25 wt %, about 30 wt %, about 35 wt %, about 40 wt %, about 45 wt %, or about 50 wt %. In some embodiments, the amount of additive in the shape memory composition is about 5 wt % to about 50 wt %. In some embodiments, the amount of additive in the shape memory composition is about 5 wt % to about 30 wt %. In some embodiments, the amount of additive in the shape memory composition is about 10 wt % to about 25 wt %. In some embodiments, the amount of additive in the shape memory composition is about 15 wt % to about 20 wt %. In some embodiments, the amount of additive in the shape memory composition is about 22 wt %. In some embodiments, the amount of additive in the shape memory composition is about 23 wt %. In some embodiments, the amount of additive in the shape memory composition is about 25 wt %. In some embodiments, the additive is a polyetheramine. An exemplary polyetheramine is JEFFAMINE® D-230 polyetheramine (a difunctional, primary amine with an average molecular weight of about 230 characterized by repeating oxypropylene units in the backbone, sold by Huntsman Corporation, The Woodlands, TX).

In some embodiments, the epoxy resin and the curing agent are present in a ratio of about 75:25, or about 70:30, or about 65:35, or about 60:40, or about 80:20, or about 85:15. In some embodiments, the epoxy resin and the curing agent are present in a ratio of about 75:25.

3D-Printed Shape Memory Composition

In some embodiments, the shape memory compositions of the present disclosure that contain a thermally-cured epoxy resin and a sliding-ring polymer additive are 3D-printed.

In some embodiments, the amount of thermally-cured epoxy resin in the 3D-printed shape memory composition is about 55 wt % to about 95 wt %, such as about 55 wt % to about 90 wt %, about 55 wt % to about 85 wt %, about 55 wt % to about 80 wt %, about 55 wt % to about 75 wt %, about 55 wt % to about 70 wt %, about 55 wt % to about 65 wt %, about 55 wt % to about 60 wt %, about 60 wt % to about 95 wt %, about 60 wt % to about 90 wt %, about 60 wt % to about 85 wt %, about 60 wt % to about 80 wt %, about 60 wt % to about 75 wt %, about 60 wt % to about 70 wt %, about 60 wt % to about 65 wt %, about 65 wt % to about 95 wt %, about 65 wt % to about 90 wt %, about 65 wt % to about 85 wt %, about 65 wt % to about 80 wt %, about 65 wt % to about 75 wt %, about 65 wt % to about 70 wt %, about 70 wt % to about 95 wt %, about 70 wt % to about 90 wt %, about 70 wt % to about 85 wt %, about 70 wt % to about 80 wt %, about 70 wt % to about 75 wt %, about 75 wt % to about 95 wt %, about 75 wt % to about 90 wt %, about 75 wt % to about 85 wt %, about 75 wt % to about 80 wt %, about 80 wt % to about 95 wt %, about 80 wt % to about 90 wt %, about 80 wt % to about 85 wt %, about 85 wt % to about 95 wt %, about 85 wt % to about 90 wt %, about 90 wt % to about 95 wt %, or about 55 wt %, about 60 wt %, about 65 wt %, about 70 wt %, about 75 wt %, about 80 wt %, about 85 wt %, about 90 wt %, or about 95 wt %. In some embodiments, the amount of thermally-cured epoxy resin in the 3D-printed shape memory composition is about 55 wt % to about 95 wt %. In some embodiments, the amount of thermally-cured epoxy resin in the 3D-printed shape memory composition is about 65 wt % to about 90 wt %. In some embodiments, the amount of thermally-cured epoxy resin in the 3D-printed shape memory composition is about 80 wt % to about 85 wt %. In some embodiments, the amount of thermally-cured epoxy resin in the 3D-printed shape memory composition is about 83 wt %. In some embodiments, the amount of thermally-cured epoxy resin in the 3D-printed shape memory composition is about 85 wt %.

In some embodiments, the amount of sliding-ring polymer additive in the 3D-printed shape memory composition is about 1 wt % to about 15 wt %, such as about 1 wt % to about 12 wt %, about 1 wt % to about 10 wt %, about 1 wt % to about 7.5 wt %, about 1 wt % to about 5 wt %, about 1 wt % to about 2.5 wt %, about 2.5 wt % to about 15 wt %, about 2.5 wt % to about 12 wt %, about 2.5 wt % to about 10 wt %, about 2.5 wt % to about 7.5 wt %, about 2.5 wt % to about 5 wt %, about 5 wt % to about 15 wt %, about 5 wt % to about 12 wt %, about 5 wt % to about 10 wt %, about 5 wt % to about 7.5 wt %, about 7.5 wt % to about 15 wt %, about 7.5 wt % to about 10 wt %, about 10 wt % to about 15 wt %, about 10 wt % to about 12 wt %, about 12 wt % to about 15 wt %, or about 1 wt %, about 2.5 wt %, about 5 wt %, about 7.5 wt %, about 10 wt %, about 12 wt %, or about 15 wt %. In some embodiments, the amount of sliding-ring polymer additive in the 3D-printed shape memory composition is about 1 wt % to about 25 wt %. In some embodiments, the amount of sliding-ring polymer additive in the 3D-printed shape memory composition is about 5 wt % to about 20 wt %. In some embodiments, the amount of sliding-ring polymer additive in the 3D-printed shape memory composition is about 10 wt % to about 15 wt %. In some embodiments, the amount of sliding-ring polymer additive in the 3D-printed shape memory composition is about 2.5 wt %. In some embodiments, the sliding-ring polymer additive is a cross-linked polyrotaxane bead. An exemplary cross-linked polyrotaxane bead is the one sold by Advanced Softmaterials (Japan). In some embodiments, the cross-linked polyrotaxane bead is surface-functionalized with epoxide rings.

Properties of the Shape Memory Composition

In some embodiments, the shape memory composition of the present disclosure is able to shape deform by subjecting the shape memory composition to an external force or stimulus. In some embodiments, the shape memory composition is made into a reconfigurable memory shape or a temporary shape by applying an external force or stimulus. In some embodiments, the external force or stimulus is selected from one or more of temperature, pressure, chemical environment, and light. In some embodiments, the external force or stimulus is temperature. In some embodiments, the shape memory composition is deformed by mechanical deformation. In some embodiments, the shape memory composition is 3D-printed. In some embodiments, topological optimization and filler alignment facilitate the improved mechanical properties in epoxy composites that are 3D-printed. In some embodiments, the sliding-ring polymer additive crosslinks into the polymer networks and endows dynamic behavior in epoxy-based polymers and in other polymers can offer shape memory characteristics and self-healing properties. In some embodiments, the 3D-printed architecture demonstrates shape memory behavior with respect to temperature and mechanical stimuli. In some embodiments, the epoxy composition containing the sliding-ring polymer additive are 3D-printed into hierarchical structures capable of gripping, unwinding, and returning to their permanent shape with good shape fixity and shape recovery with minor permanent deformation.

In some embodiments, the shape memory composition is deformable at a temperature of about 80° C. to about 120° C., such as about 80° C. to about 120° C., about 80° C. to about 115° C., about 80° C. to about 110° C., about 80° C. to about 105° C., about 80° C. to about 100° C., about 80° C. to about 95° C., about 80° C. to about 90° C., about 80° C. to about 85° C., about 85° C. to about 120° C., about 85° C. to about 115° C., about 85° C. to about 110° C., about 85° C. to about 105° C., about 85° C. to about 100° C., about 85° C. to about 95° C., about 85° C. to about 90° C., about 90° C. to about 120° C., about 90° C. to about 115° C., about 90° C. to about 110° C., about 90° C. to about 105° C., about 90° C. to about 100° C., about 90° C. to about 95° C., about 95° C. to about 120° C., about 95° C. to about 115° C., about 95° C. to about 110° C., about 95° C. to about 105° C., about 95° C. to about 100° C., about 100° C. to about 120° C., about 100° C. to about 115° C., about 100° C. to about 110° C., about 100° C. to about 105° C., about 105° C. to about 120° C., about 105° C. to about 115° C., about 105° C. to about 110° C., about 110° C. to about 120° C., about 110° C. to about 115° C., about 115° C. to about 120° C., or about 80° C., about 85° C., about 90° C., about 95° C., about 100° C., about 105° C., about 110° C., about 115° C., or about 120° C. In some embodiments, the shape memory composition is deformable at a temperature of about 100° C. In some embodiments, the shape memory composition holds or retains the deformed (or temporary) shape (is shape memorable) after the shape memory composition returns to a lower temperature, such as room temperature. In some embodiments, the shape memory composition is 3D-printed.

In some embodiments, the shape memory composition in a deformed or temporary shape is transformed back to its original shape by applying an external force or stimulus. In some embodiments, the external force or stimulus is selected from one or more of temperature, pressure, chemical environment, and light. In some embodiments, the external force or stimulus is temperature. In some embodiments, the external force or stimulus is the same external force or stimulus that was applied to form the deformed or temporary shape.

In some embodiments, the shape memory composition is deformed by mechanical deformation. In some embodiments, the shape memory composition is 3D-printed.

In some embodiments, the shape memory composition in a deformed or temporary shape is transformed back to its original shape at a temperature of about 25° C. to about 140° C., such as about 25° C. to about 130° C., about 25° C. to about 120° C., about 25° C. to about 110° C., about 25° C. to about 100° C., about 25° C. to about 90° C., about 25° C. to about 80° C., about 25° C. to about 70° C., about 25° C. to about 60° C., about 25° C. to about 50° C., about 25° C. to about 40° C., about 25° C. to about 30° C., about 30° C. to about 140° C., about 30° C. to about 130° C., about 30° C. to about 120° C., about 30° C. to about 110° C., about 30° C. to about 100° C., about 30° C. to about 90° C., about 30° C. to about 80° C., about 30° C. to about 70° C., about 30° C. to about 60° C., about 30° C. to about 50° C., about 30° C. to about 40° C., about 40° C. to about 140° C., about 40° C. to about 130° C., about 40° C. to about 120° C., about 40° C. to about 110° C., about 40° C. to about 100° C., about 40° C. to about 90° C., about 40° C. to about 80° C., about 40° C. to about 70° C., about 40° C. to about 60° C., about 40° C. to about 50° C., about 50° C. to about 140° C., about 50° C. to about 130° C., about 50° C. to about 120° C., about 50° C. to about 110° C., about 50° C. to about 100° C., about 50° C. to about 90° C., about 50° C. to about 80° C., about 50° C. to about 70° C., about 50° C. to about 60° C., about 60° C. to about 140° C., about 60° C. to about 130° C., about 60° C. to about 120° C., about 60° C. to about 110° C., about 60° C. to about 100° C., about 60° C. to about 90° C., about 60° C. to about 80° C., about 60° C. to about 70° C., about 70° C. to about 140° C., about 70° C. to about 130° C., about 70° C. to about 120° C., about 70° C. to about 110° C., about 70° C. to about 100° C., about 70° C. to about 90° C., about 70° C. to about 80° C., about 80° C. to about 140° C., about 80° C. to about 130° C., about 80° C. to about 120° C., about 80° C. to about 110° C., about 80° C. to about 100° C., about 90° C. to about 140° C., about 90° C. to about 130° C., about 90° C. to about 120° C., about 90° C. to about 110° C., about 90° C. to about 100° C., about 100° C. to about 140° C., about 100° C. to about 130° C., about 100° C. to about 120° C., about 100° C. to about 110° C., about 110° C. to about 140° C., about 110° C. to about 130° C., about 110° C. to about 120° C., about 120° C. to about 140° C., about 120° C. to about 130° C., about 130° C. to about 140° C., or about 25° C., about 30° C., about 40° C., about 50° C., about 60° C., about 70° C., about 80° C., about 90° C., about 100° C., about 110° C., about 120° C., about 130° C., or about 140° C. In some embodiments, the shape memory composition in a deformed or temporary shape is transformed back to its original shape at a temperature of about 100° C. In some embodiments, the shape memory composition retains its original shape after the shape memory composition returns to a lower temperature, such as room temperature. In some embodiments, the shape memory composition is 3D-printed.

In some embodiments, the storage modulus of the shape memory composition of the present disclosure that contains a sliding-ring polymer additive is the same or similar as compared to the same shape memory composition that does not include a sliding-ring polymer additive. In some embodiments, the storage modulus of the shape memory composition of the present disclosure that contains a sliding-ring polymer additive decreases by about 5% to about 80% as compared to a shape memory composition that does not include a sliding-ring polymer additive, such as a decrease of about 5% to about 70%, about 5% to about 60%, about 5% to about 50%, about 5% to about 40%, about 5% to about 30%, about 5% to about 20%, about 5% to about 10%, about 10% to about 80%, about 10% to about 70%, about 10% to about 60%, about 10% to about 50%, about 10% to about 40%, about 10% to about 30%, about 10% to about 20%, about 20% to about 80%, about 20% to about 70%, about 20% to about 60%, about 20% to about 50%, about 20% to about 40%, about 20% to about 30%, about 30% to about 80%, about 30% to about 70%, about 30% to about 60%, about 30% to about 50%, about 30% to about 40%, about 40% to about 80%, about 40% to about 70%, about 40% to about 60%, about 40% to about 50%, about 50% to about 80%, about 50% to about 70%, about 50% to about 60%, about 60% to about 80%, about 60% to about 70%, about 70% to about 80%, or about 5%, about 10%, about 15%, about 20%, about 25%, about 30%, about 35%, about 40%, about 45%, about 50%, about 55%, about 60%, about 65%, about 70%, about 75%, or about 80%. In some embodiments, the amount of storage modulus decrease varies with respect to the amount of sliding-ring polymer in the composition. In some embodiments, the storage modulus of the shape memory composition of the present disclosure that contains a sliding-ring polymer additive decreased at lower temperature as compared to the shape memory composition that does not include a sliding-ring polymer additive. In some embodiments, the shape memory composition is 3D-printed.

In some embodiments, the tan delta value (loss modulus/storage modulus ratio) of the shape memory composition of the present disclosure that contains a sliding-ring polymer additive decreased as compared to the shape memory composition that does not include a sliding-ring polymer additive. In some embodiments, the shape memory composition of the present disclosure that contains a sliding-ring polymer additive has a glass transition temperature that is lower than a shape memory composition that does not include a sliding-ring polymer additive. In some embodiments, the glass transition is lower by about 1% to about 10%, such as about 1% to about 9%, about 1% to about 8%, about 1% to about 7%, about 1% to about 6%, about 1% to about 5%, about 1% to about 4%, about 1% to about 3%, about 1% to about 2%, about 2% to about 10%, about 2% to about 9%, about 2% to about 8%, about 2% to about 7%, about 2% to about 6%, about 2% to about 5%, about 2% to about 4%, about 2% to about 3%, about 3% to about 10%, about 3% to about 9%, about 3% to about 8%, about 3% to about 7%, about 3% to about 6%, about 3% to about 5%, about 3% to about 4%, about 4% to about 10%, about 4% to about 9%, about 4% to about 8%, about 4% to about 7%, about 4% to about 6%, about 4% to about 5%, about 5% to about 10%, about 5% to about 9%, about 5% to about 8%, about 5% to about 7%, about 5% to about 6%, about 6% to about 10%, such as about 6% to about 9%, about 6% to about 8%, about 6% to about 7%, about 7% to about 10%, about 7% to about 9%, about 7% to about 8%, about 8% to about 10%, about 8% to about 9%, about 9% to about 10%, or about 1%, about 2%, about 3%, about 4%, about 5%, about 6%, about 7%, about 8%, about 9%, or about 10%, as compared to a shape memory composition that does not include a sliding-ring polymer additive. In some embodiments, the shape memory composition is 3D-printed.

Method of Preparing a Shape Memory Composition

Provided in the present disclosure is a method of preparing a shape memory composition, such as a shape memory composition described in this application. In some embodiments, the method includes mixing a sliding-ring polymer additive with a thermally-cured epoxy resin. In some embodiments, the sliding-ring polymer additive is as described in the present disclosure. In some embodiments, the sliding-ring polymer additive is as described in in any one of U.S. Pat. Nos. 7,612,142; 7,622,527; 7,799,867; 7,847,049; 7,893,168; 7,943,718; 7,981,943; 8,007,911; 8,450,415; 8,580,906; 9,068,051; and 9,266,972; each of which is incorporated by reference in its entirety. In some embodiments, the composition is cured.

Also provided in the present disclosure is a method of preparing a 3D-printed shape memory composition, such as a 3D-printed shape memory composition described in this disclosure. In some embodiments, the 3D-printed shape memory composition includes a 3D printing ink. In some embodiments, the 3D printing ink includes an epoxy composition. In some embodiments, the epoxy composition contains two or more epoxy resins. In some embodiments, the epoxy resin contains a bisphenol A-based epoxy resin, a polyetheramine resin, or combination thereof. In some embodiments, the bisphenol A-based epoxy resin is EPON™ Resin 826. In some embodiments, the epoxy resin contains a bisphenol A-based epoxy resin and a polyetheramine resin. In some embodiments, the polyetheramine resin is JEFFAMINE® D-230 polyetheramine. In some embodiments, the method includes mixing a sliding-ring polymer additive with a thermally-cured epoxy resin. In some embodiments, the sliding-ring polymer additive is as described in the present disclosure. In some embodiments, the sliding-ring polymer additive is as described in in any one of U.S. Pat. Nos. 7,612,142; 7,622,527; 7,799,867; 7,847,049; 7,893,168; 7,943,718; 7,981,943; 8,007,911; 8,450,415; 8,580,906; 9,068,051; and 9,266,972; each of which is incorporated by reference in its entirety. In some embodiments, the 3D-printed structures are cured. In some embodiments, the 3D-printed structures are cured by heat.

Methods of Using the Shape Memory Composition Containing a Sliding-Ring Polymer Additive Provided in this disclosure is a method of treating a subterranean formation. In some embodiments, the shape memory composition contains cement. Thus, also provided is a method for providing long-term zonal isolation in oil wells (that is, subterranean formations) including providing to an oil well a shape memory composition that contains cement and a sliding-ring polymer additive such as described in this disclosure. In some embodiments, the sliding-ring polymer additive is as described in any one of U.S. Pat. Nos. 7,612,142; 7,622,527; 7,799,867; 7,847,049; 7,893,168; 7,943,718; 7,981,943; 8,007,911; 8,450,415; 8,580,906; 9,068,051; and 9,266,972; each of which is incorporated by reference in its entirety. In some embodiments, the providing occurs above the surface. The providing can also occur in the subterranean formation.

The subterranean formation can contain a wellbore containing a steel casing or multiple casings, a cement sheath in the annuli, and optionally a packer and a production tubing. The cement sheath, can experience stresses and annular pressure buildup due to, for example, gas flow through microchannels in the annulus, forming microannuli, and fractures (for example, microfractures), cracks and clefts within or around the cement sheath, the casing, or the production tubing. This can result in a deterioration of the mechanical properties of the cement and lead to formation of micro-cracks and fractures, which affect the production and increase the cost of operation.

In some embodiments, the shape memory composition is stable in downhole conditions. In some embodiments, the shape memory composition responds to external stimulus or force in the subterranean formation by deforming its structure. In some embodiments, the sliding-ring polymer additive allows for uniform distribution of the stresses experienced in the cement matrix, thus enhancing the properties of the shape memory composition.

EXAMPLES

Example 1—Synthesis of polyrotaxanes

A series of polyrotaxanes were prepared from linear polymers that included polyethylene glycol (PEG), polypropylene glycol (PPG), block copolymers of PEG and PPG, and polysiloxanes (PS) that were terminated with one or more of an amine, carboxylate, azide, isocyanate, carbonyl chloride, halide, and thiol; and ring components that included α-cyclodextrin (α-CD), β-cyclodextrin (β-CD), and γ-cyclodextrin (γ-CD).

Inclusion Complexes

An exemplary polyrotaxane inclusion complex was prepared as follows.

9.0 g of carboxylate terminated polyethylene glycol (HOOC-PEG-COOH, MW=20000) and 36.0 g of α-cyclodextrin (α-CD) were dissolved in 100 mL deionized water and kept refrigerated for 24 h. The polyrotaxane inclusion complex formed as a white paste which was dried at room temperature under vacuum or freeze-dried, to obtain a white powder, designated as inclusion complex A.

Similar methods were employed to obtain the inclusion complexes of carboxy-terminated polypropylene glycol (HOOC-PPG-COOH) and carboxy-terminated polysiloxanes (HOOC—PS—COOH) with β-cyclodextrin (β-CD) and γ-cyclodextrin (γ-CD), respectively.

10 grams (g) of ($NH_2$—PS—$NH_2$, MW=25000) and 30.0 g of γ-cyclodextrin (γ-CD) were dissolved in 100 milliliters (mL) deionized water and stirred at room temperature for 12 hours (h). The polyrotaxane formed as a white precipitate, which was filtered and dried at 80° C. under vacuum or freeze-dried, to obtain a white powder, designated as γ-CD-PS—$NH_2$.

A similar method was employed to obtain the inclusion complexes of R-terminated PEG, PPG, PS and block polymers of PEG and PPG. α-cyclodextrin (α-CD), β-cyclodextrin (β-CD), γ-cyclodextrin (γ-CD), or combination of these cyclic compounds with linear polymers.

End-Capped Inclusion Complexes

The dried inclusion complex A (10 g) was mixed with adamantanamine (0.13 g), (benzotriazol-1-yloxy)tris(dimethylamino)phosphonium hexafluorophosphate (0.4 g), and ethyldiisopropylamine (0.12) dissolved in 80 mL dimethylformamide. The mixture was reacted at 2-5° C. for 24 h. The dispersion was filtered or centrifuged and washed with a mixture of dimethylformamide/methanol 2-3 times. The precipitates were dissolved in dimethylsulfoxide and precipitated by adding deionized water. The precipitates were filtered/centrifuged and dried at room temperature under vacuum or freeze dried, to obtain polyrotaxane A.

When there are other functionalities (such as amine, azide, isocyanate, carbonyl chloride, halides, thiol) present in complex A, capping agents such as adamantaneacetic acid, 2,4-dinitrofluorobenzene, and amine-terminated aromatic compounds have been employed.

Functionalized polyrotaxanes 3.5 g of polyrotaxane A was dissolved in 1 N aqueous NaOH (350 mL) at 0-5° C. Propylene oxide (26.8 g) was added drop-wise, and the mixture stirred overnight from 0-5° C. to room temperature with the melting of ice in the bath. The functionalized polyrotaxane was dialyzed against deionized water for 3 days. The water was evaporated or the solution was freeze-dried under vacuum to obtain functionalized polyrotaxane A.

The described functionalization is based on hydroxypropylation. However, functionalization such as methylation, hydroxypropylation, tritylation, acetylation, trimethylsilylation, phenylcarbamation, dansylation, and nitration, can also be used to generate functionalized polyrotaxanes.

Sliding-Ring Polymer Synthesis 9.5 g of polyacrylic acid (MW=450,000) was dissolved in 190 mL dimethyl sulfoxide. 0.12 g of 1,1'-carbonyldiimidazole dissolved in 5 mL dimethylsulfoxide was then added to the solution and the mixture was stirred at 50° C. for 12-15 h under an inert atmosphere. The reaction mixture was cooled to room temperature. A solution of functionalized polyrotaxane A (0.5 g in 5 mL dimethylsulfoxide) was added over 30 min under an inert atmosphere with stirring. After stirring for 30 min at room temperature, the reaction mixture was heated to 65-70° C. for 72 h. The sliding-ring polymer was precipitated from tetrahydrofuran and filtered. The polymer was dried at room temperature under vacuum or freeze-dried, to obtain sliding-ring polymer A.

Other than polyacrylic acid, polymers with high molecular weight and functionalities such as carboxylic acid, maleic acid, and amine groups were also employed to obtain sliding-ring polymers.

Cross-Linked polyrotaxanes 20 g of γ-CD-PS—NH$_2$ was dispersed in acetonitrile (250 mL) and triethylamine (10 mL) was added. A solution of cyanuric chloride (CC; 2 g in 20 mL acetonitrile) was added to the above mixture at room temperature with stirring. The reaction mixture was refluxed for 8 hours and the precipitates were filtered and dried at 80° C. to obtain the cross-linked polyrotaxane γ-CD-PS—NH—CC.

Example 2—Formulation of Epoxy Compositions

Figure 4:
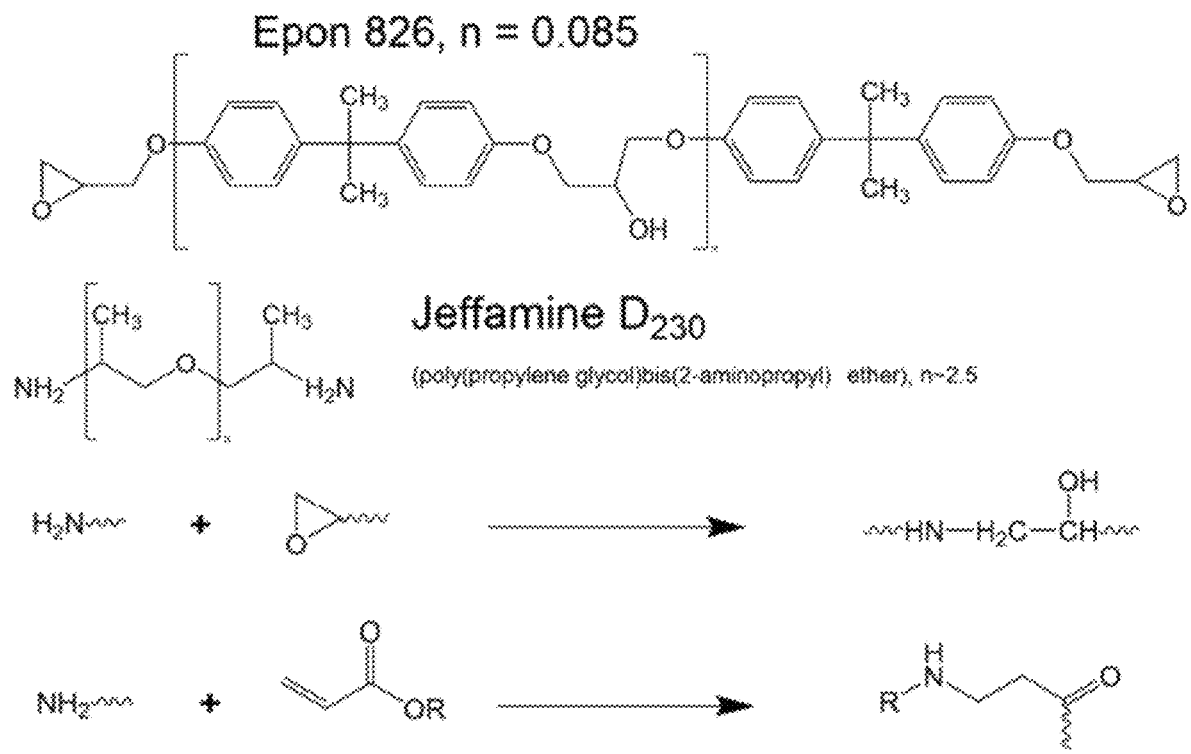
FIG. 4 is a schematic showing the structures of an exemplary epoxy resin and exemplary polyetheramine and exemplary reaction pathways to form exemplary epoxy compositions.

A two-part epoxy using EPON™ resin 826 (a low viscosity, light colored liquid bisphenol A based epoxy resin sold by Hexion Inc., Columbus, OH) and JEFFAMINE® D-230 polyetheramine (a difunctional, primary amine with an average molecular weight of about 230 characterized by repeating oxypropylene units in the backbone, sold by Huntsman Corporation, The Woodlands, TX) were mixed at a ratio of 3:1 by weight through mechanical stirring. The resin mixture was centrifuged to remove air bubbles at 2000 rotations per minute for 40 seconds. The chemical formulation and reactions are shown in FIG. 4.

Figure 5:
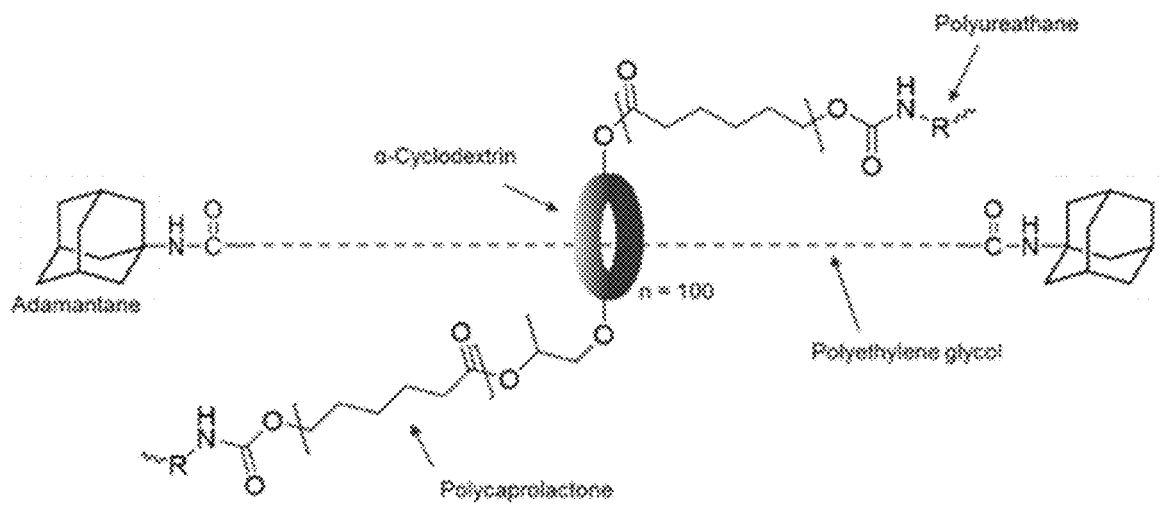
FIG. 5 depicts the structure of exemplary polyrotaxanes beads (PRB).

A second composition that contained the same two-part epoxy and cross-linked polyrotaxane beads (PRB) was prepared. The composition contained 10 wt % of PRB with respect to the total weight of the two-part resin. Before adding PRBs to the resin, the PRB were heated at 110° C. for one hour to remove absorbed moisture. Then, after cooling to room temperature, the PRB were added to JEFFAMINE® D-230 polyetheramine and mixed vigorously before adding EPON™ Resin 826. The resin was centrifuged for 40 seconds at 2000 RPM before casting. The cross-linked polyrotaxane beads were from Advanced Softmaterials (Japan) (FIG. 5). The polyrotaxane beads were composed of a mixture of polyethyleneglycol, alpha-cyclodextrin, polycaprolactum, polyurethane, and adamantane. Briefly, alpha-cyclodextrin was threaded on the polyethylene chain and subsequently capped on both side of the polyethylene glycol chain by adamantane. The polycaprolactum and polyurethane were linked on the surface of cyclodextrin. This generated the cross-linked polyrotaxanes beads. The acrylate moieties on the polyrotaxane monomers reacted with the amines through an aza-Michael addition. Polyrotaxane beads (PRB), a pre-crosslinked polyrotaxane structure, was added into the epoxy mixture. The epoxide reacted with hydroxyl groups of the cyclodextrin to form a crosslinked PRB epoxy structure owing to the enhanced strain tolerance observed in PRB. The formulation was cured at 225° F. for 1 hour and at 266° F. for 1.5 hours.

Example 3—Epoxy Ink for 3D-Printing 3D printing inks were formulated by mixing EPON™ Resin 826 and JEFFAMINE® D-230 polyetheramine in a 3:1 wt % ratio. A planetary centrifugal mixer was employed to ensure homogeneous mixing of each component. Samples were printed using a HyRel High Resolution Engine with a 14-gauge nozzle and STL files were sliced using Slic3r software. The curing of 3D-printed structures was carried out by heating the samples at 107° C. for 90 minutes. Subsequently, the temperature was raised to 130° C. and kept for 60 minutes.

Example 4—Thermal Analysis

Figure 6:
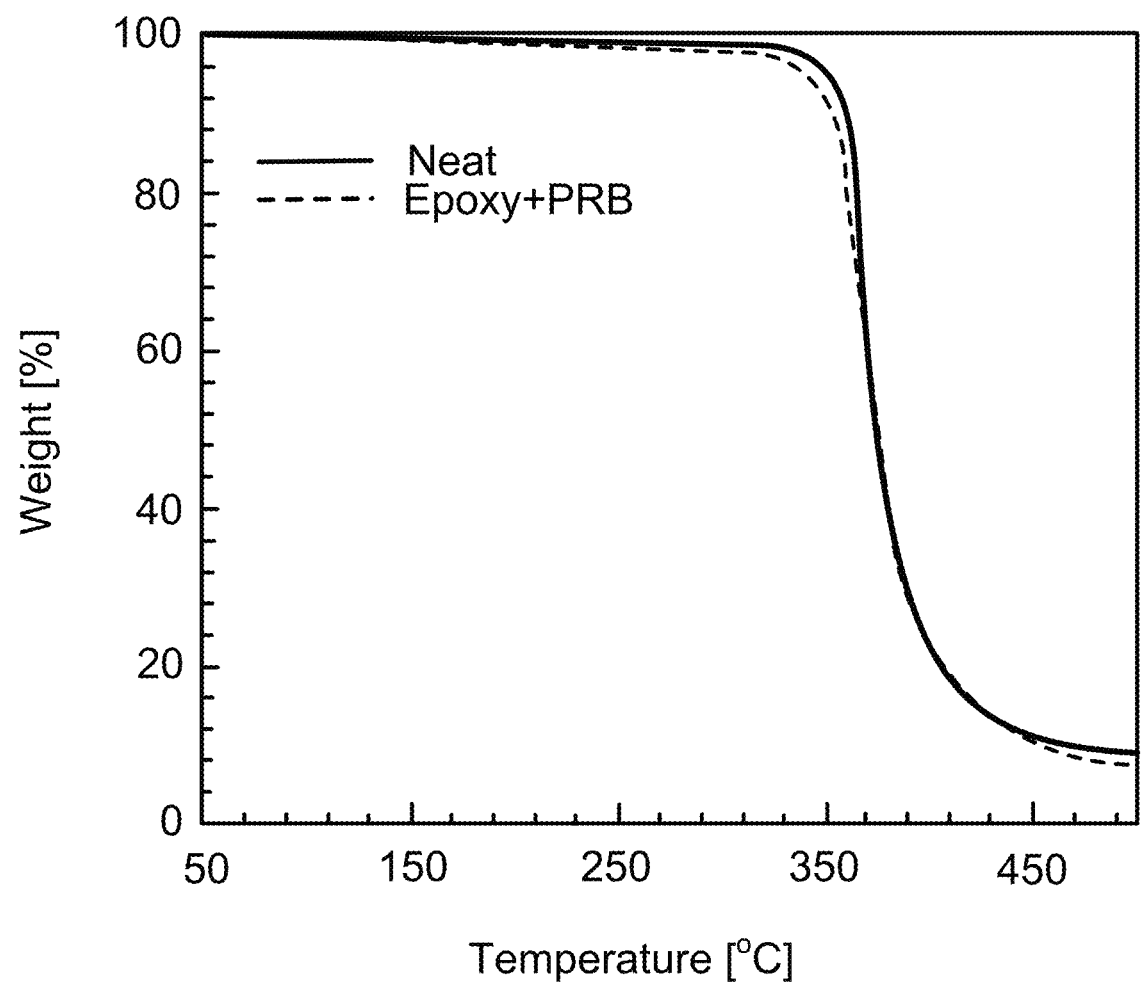
FIG. 6 shows the TGA curve of epoxy and epoxy with exemplary polyrotaxanes beads.

Thermogravimetric analysis (TGA) was performed using a TA SDT 650 ramping at 10° C./min from 25° C. to 500° C. The cured samples of epoxy and epoxy/PRB were subjected to thermogravimetric analysis to understand the decomposition behavior of these samples. No noticeable difference in the thermal stability was observed. The thermal stability of epoxy and epoxy with PRB was about 285° C. (FIG. 6).

Example 5—Shape Memory Behavior

Shape memory behavior was tested for the epoxy/PRB composites. Briefly, the universal testing machine was used to test flexural properties (three-point bend test). The load was applied at a rate of 1 mm/min. The sample size was 2 mm thickness, 33 mm length, and 10 mm wide. The testing was conducted at room temperature.

The epoxy/PRB samples were deformed after flexural tests and there were no visible fractures in the samples. The samples were allowed to retain their original shapes through thermal treatment (the samples were placed in an oven at desired temperature) and the recovered samples were again subjected to flexural tests. Upon cycling at room temperature, Young's modulus decreased and the samples which did not fail demonstrated lower ultimate strength by ~10%. Flexural and shape memory behavior tests for the neat epoxy samples were unable to be conducted due to breakage of the samples.

Figure 7A:
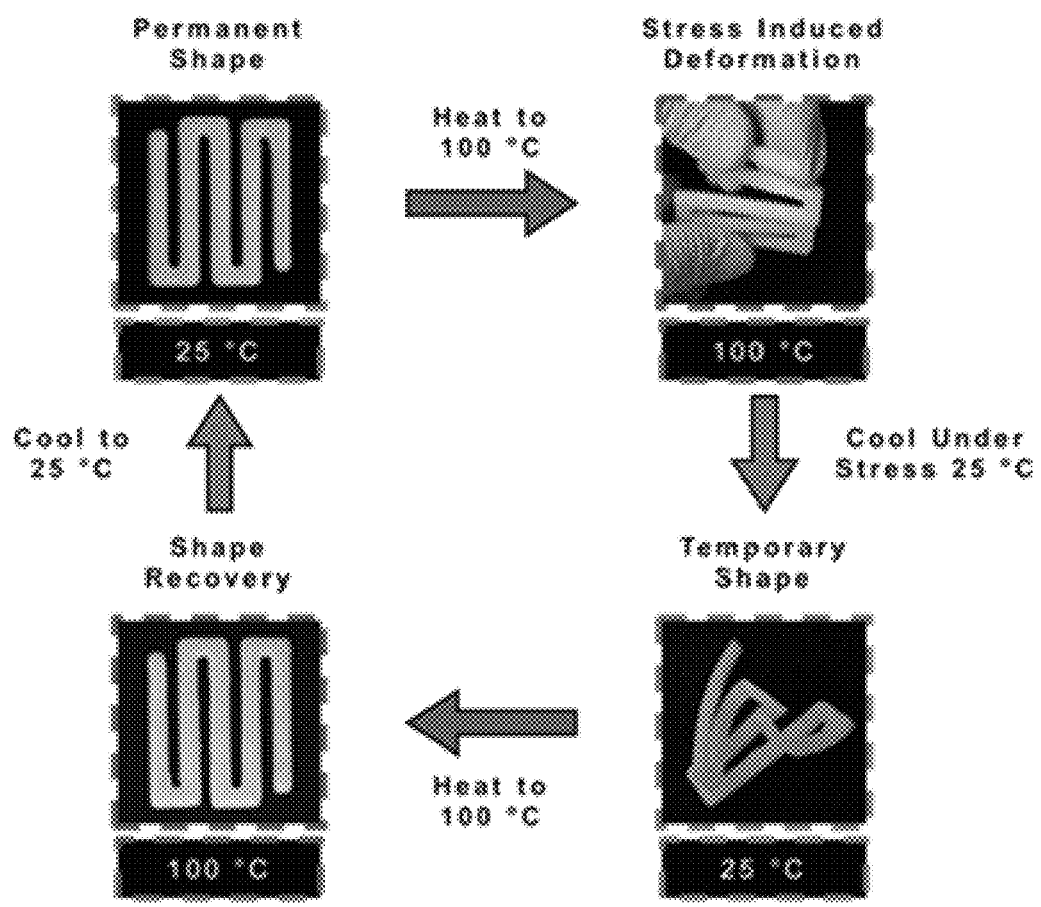
FIGS. 7A-7C illustrate the shape memory behavior of exemplary epoxy/PRB composites.
Figure 7B:
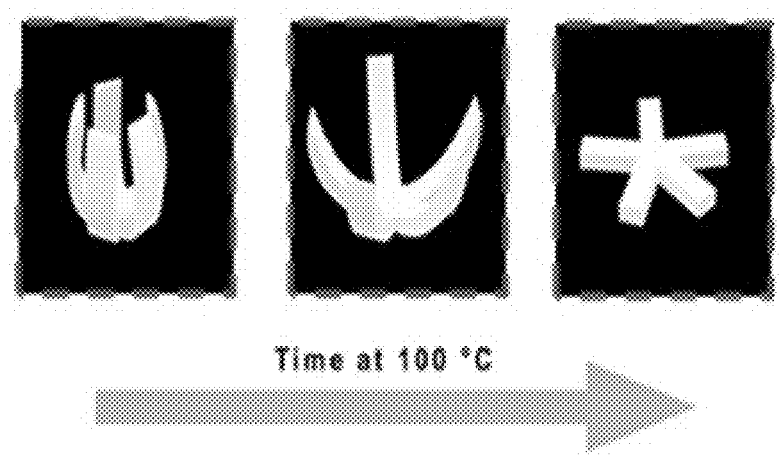
Figure 7C:
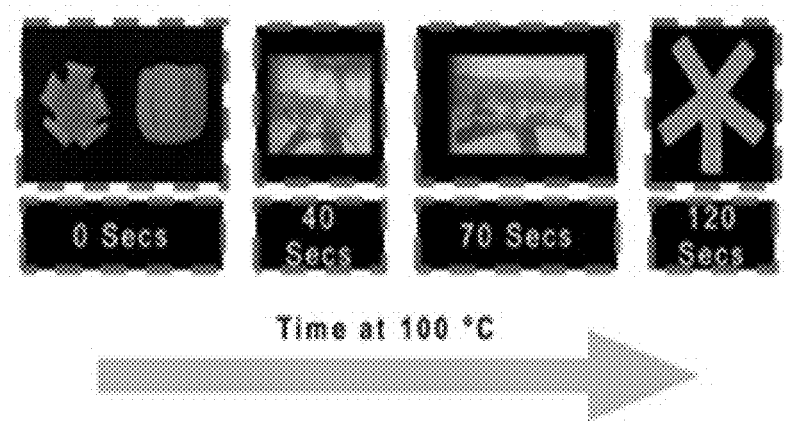

To further investigate the observed shape memory behavior of the epoxy/PRB composites, different types of epoxy/PRB structures or patterns were printed (FIGS. 7A-7C). The 3D-printed structures were heated to 100° C. and were deformed by mechanical deformation (FIG. 7A). Each structure was deformed and held under stress until the sample cooled to room temperature. At room temperature, the sample retained the temporary shape. The deformed temporary shape was transformed through subsequent heat treatment at 100° C., which resulted in the original state of the 3D-printed structures. It is significant to note that the kinetics of recovery to the original shapes was also dependent on the size and thickness of the epoxy/PRB composites. The thickness of the sample varied from 0.5 mm to 4 mm, and depending on the loading of the PRB, shape memory behavior could potentially be observed in samples less than 0.5 mm thick.

The path of deformation and recovery was predicted through computer modeling of the 3D-printed structures (FIG. 7B). A five-pronged grappler-type 3D-printed structure of epoxy/PRB was prepared and analyzed for shape memory behavior with respect to time and temperature (FIG. 7C). A temporary deformed 3D-printed structure at 100° C. underwent structural changes and retained its original shapes. The still frame images depict the transition of the five-pronged grappler unfolding over two minutes (FIG. 7C). The 3D-printed grappler can be seen suspended above the ground holding a centrifuge capsule.

Figure 8A:
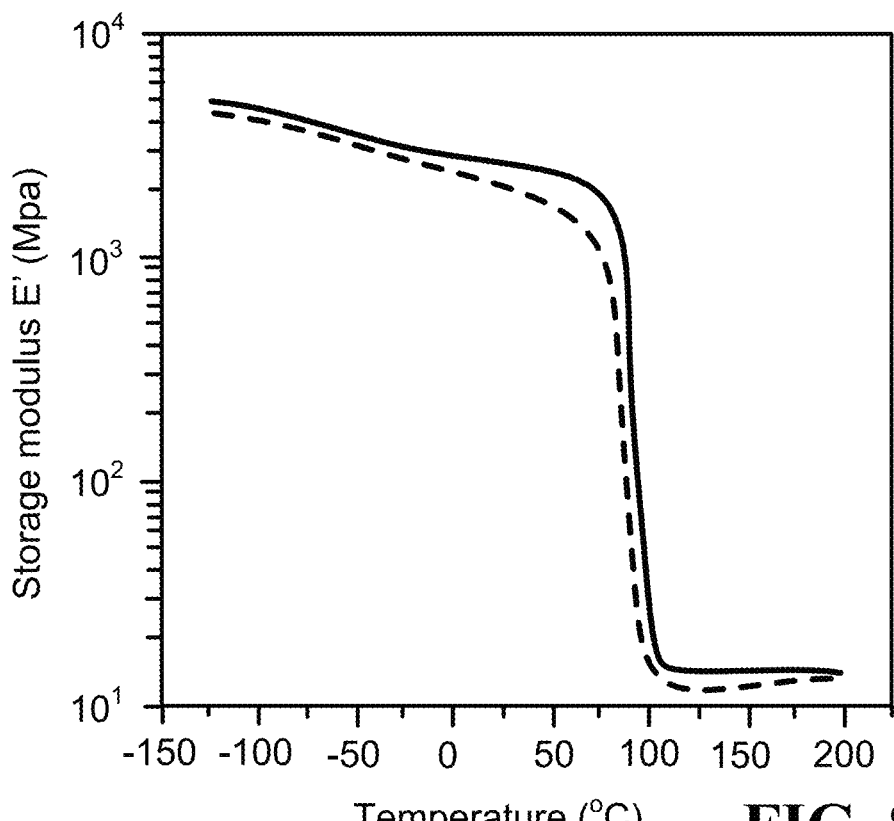
FIGS. 8A-8B shows dynamic mechanical analysis (DMA) of epoxy and epoxy/PRB composites.
Figure 8B:
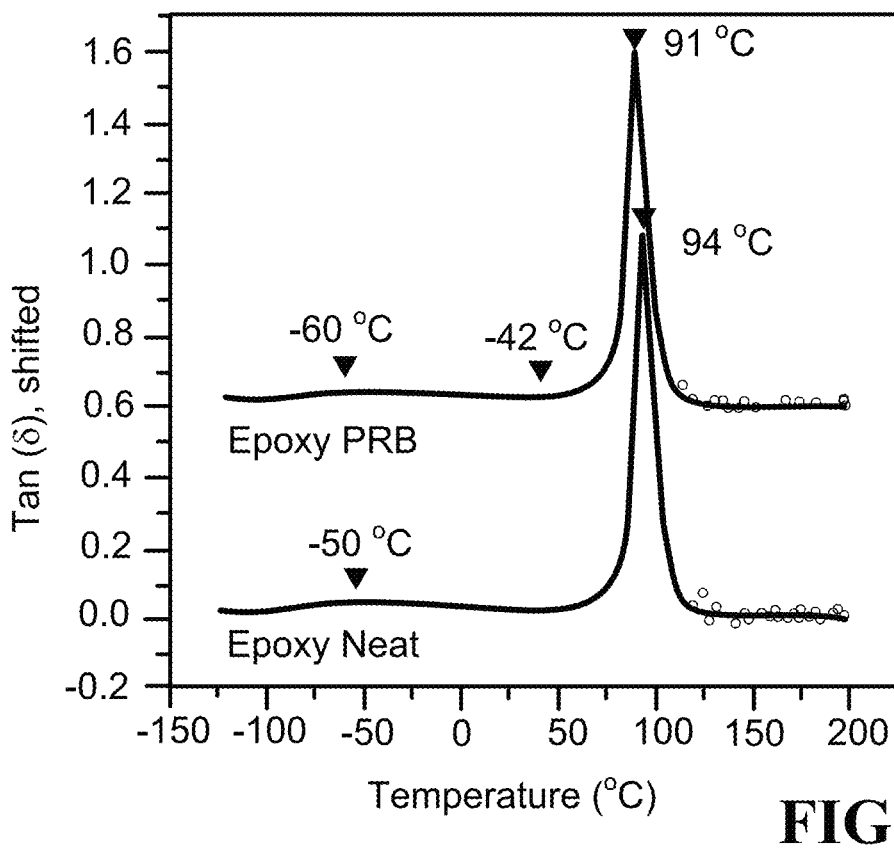

Dynamic mechanical analysis (DMA) of epoxy and epoxy/PRB were studied to identify changes in the storage modulus and loss modulus upon addition of PRB in epoxy (FIGS. 8A-8B). No significant difference in storage modulus and loss factor (tan δ) were observed between neat epoxy and epoxy/PRB composites. The storage modulus of epoxy/PRB declined at lower temperature when compared to neat epoxy. Similarly, the peak of tan δ for epoxy/PRB composite also shifted toward a lower temperature from 94° C. to 91° C. In addition, the formation of a tan δ peak in epoxy/PRB was observed at 42° C., which may correspond to the softening of the PRB in epoxy matrix. The softening of the PRB may have originated from the chemical architecture of the polyrotaxanes since it contained polyethylene glycol and cyclodextrin as components within the cross-linked network of the PRB. The room temperature shape memory characteristics of epoxy/PRB can be explained from this low temperature softening behavior.

What is claimed is:

1. A shape memory composition comprising:
   about 60 wt % to about 90 wt % of a thermally-curable epoxy resin; and
   about 1 wt % to about 25 wt % of a sliding-ring polymer additive comprising at least two molecules of a polyrotaxane, wherein the polyrotaxane comprises:
   a linear polymer;
   at least one ring compound, wherein the linear polymer is threaded through the opening of the ring compound, wherein the at least one ring compound is substituted with at least one member selected from:
   an —O—CO—$R^2$ group and at least one ether group, wherein $R^2$ is a linear or branched alkyl group having 1-12 carbons,
   polyurethane,
   or a combination thereof; and
   stopper groups disposed at both end terminals of the linear polymer;
   wherein the shape memory composition is able to shape deform from an original shape into a reconfigurable memory shape or temporary shape by applying a temperature of about 80° C. to about 120° C. and is shape memorable at room temperature; and
   wherein the reconfigurable memory shape or the temporary shape is transformed back to the original shape at a temperature of about 25° C. to about 140° C.

2. The shape memory composition of claim 1, wherein the epoxy resin is present in an amount of about 65 wt % to about 90 wt %, about 75 wt % to about 85 wt %, or about 80 wt % to about 85 wt % of the shape memory composition.

3. The shape memory composition of claim 1, wherein the sliding-ring polymer additive is cross-linked polyrotaxane beads.

4. The shape memory composition of claim 3, wherein the cross-linked polyrotaxane beads are surface-functionalized with epoxide rings.

5. The shape memory composition of claim 1, wherein the sliding-ring polymer additive is present in an amount of about 1 wt % to about 15 wt %, about 2 wt % to about 10 wt %, about 2.5 wt % to about 5 wt %, about 5 wt % to about 20 wt %, or about 10 wt % to about 15 wt % of the shape memory composition.

6. The shape memory composition of claim 1, wherein the sliding-ring polymer additive is present in an amount of about 10 wt % of the shape memory composition.

7. The shape memory composition of claim 1, wherein the shape memory composition is able to be 3D-printed.

8. The shape memory composition of claim 1, wherein the shape memory composition is deformable at a temperature of about 100° C. and shape memorable at room temperature.

9. The shape memory composition of claim 1, wherein the shape memorable form is transformed back to the original shape at a temperature of about 100° C.

* * * * *